(12) United States Patent  (10) Patent No.: US 7,643,833 B2
Sankisa                    (45) Date of Patent:    Jan. 5, 2010

(54) METHODS AND SYSTEMS FOR PROXIMITY COMMUNICATION

(75) Inventor: Arun Sankisa, Chicago, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 448 days.

(21) Appl. No.: 11/382,608

(22) Filed: May 10, 2006

(65) Prior Publication Data
US 2006/0194589 A1    Aug. 31, 2006

Related U.S. Application Data

(63) Continuation-in-part of application No. 10/953,740, filed on Sep. 29, 2004.

(51) Int. Cl.
H04W 24/00 (2006.01)

(52) U.S. Cl. .............. 455/456.1; 455/456.3; 455/456.6; 455/457; 455/41.2

(58) Field of Classification Search .............. 455/456.1, 455/456.3, 456.6, 457, 41.2
See application file for complete search history.

(56) References Cited

U.S. PATENT DOCUMENTS

| 6,784,572 | B1 * | 8/2004 | Backman et al. ............... 310/12 |
| 6,957,069 | B2 * | 10/2005 | Shah et al. ................... 455/436 |
| 7,016,673 | B2 * | 3/2006 | Reddy et al. ............. 455/426.2 |
| 7,162,237 | B1 * | 1/2007 | Silver et al. .............. 455/432.3 |
| 2002/0028674 | A1 * | 3/2002 | Slettengren et al. ......... 455/422 |
| 2002/0068592 | A1 * | 6/2002 | Hutcheson et al. .......... 455/501 |
| 2002/0131445 | A1 * | 9/2002 | Skubic et al. ............... 370/465 |
| 2003/0149527 | A1 * | 8/2003 | Sikila ......................... 701/213 |
| 2004/0023652 | A1 * | 2/2004 | Shah et al. ................ 455/426.2 |
| 2004/0034776 | A1 * | 2/2004 | Fernando et al. ............. 713/171 |
| 2004/0127214 | A1 * | 7/2004 | Reddy et al. .............. 455/426.2 |
| 2004/0147223 | A1 * | 7/2004 | Cho ........................... 455/41.2 |
| 2004/0172440 | A1 * | 9/2004 | Nakajima et al. ............ 709/200 |
| 2004/0230373 | A1 * | 11/2004 | Tzamaloukas ............... 701/208 |
| 2005/0032527 | A1 * | 2/2005 | Sheha et al. .............. 455/456.1 |
| 2005/0111383 | A1 * | 5/2005 | Grob et al. ................... 370/254 |
| 2005/0143095 | A1 * | 6/2005 | Jacob ....................... 455/456.3 |
| 2005/0220106 | A1 * | 10/2005 | Raverdy et al. .............. 370/392 |
| 2005/0221813 | A1 * | 10/2005 | Rajahalme et al. ........ 455/422.1 |
| 2006/0068703 | A1 * | 3/2006 | Ng et al. ..................... 455/41.2 |

* cited by examiner

Primary Examiner—Joseph H Feild
Assistant Examiner—Huy D Nguyen
(74) Attorney, Agent, or Firm—Duft, Bornsen & Fishman, LLP

(57) ABSTRACT

Methods and systems for proximity based communication between users of proximity communication devices ("PCDs"). A localized communication network is established by peer-to-peer communication between PCDs. Each PCD communicates with other PCDs in a wireless, localized, peer-to-peer network structure. Each PCD is identified to other PCDs in its own localized area by its geographical position and/or other attributes. A user may therefore establish communications with another user based upon the other user's proximity to the first user's PCD or other attributes rather than by a fixed ID code such as a phone number or address. The PCDs may share multiple synchronization channels derived from multiple timing sources and may select among the synchronization channels when establishing a connection. The PCDs may provide a user interface to permit filtering of display of PCDs in the proximity of communication and may also provide multi-player video gaming through the proximity communication features hereof.

19 Claims, 8 Drawing Sheets

METHODS AND SYSTEMS FOR PROXIMITY COMMUNICATION

RELATED PATENTS

This patent application is a Continuation in Part of commonly owned, co-pending U.S. patent application Ser. No. 10/953,740, filed 29 Sep. 2004 and entitled Methods and Systems for Proximity Communication, which is hereby incorporated by reference.

BACKGROUND OF THE INVENTION

1. Field of the Invention

The invention relates generally to communication systems and more specifically relates to methods and systems for communicating among communication devices identified by physical location and/or relative proximity.

2. Statement of the Problem

Numerous types of communication systems are known, commercially available and particularly suited to one or another particular application. For example, standard "landline" telephony networks permit a user to establish communications through a vast switched network to virtually any other point on the globe having similar landline communication systems. Or, for example, cellular telephony utilizes frequency transceivers and related protocols to couple an end user's cellular telephone to a nearby cellular tower. Cellular tower base stations forward digitized voice data, analog voice data or other digital data to other towers as a cell phone moves out of range and also forwards user data for coupling to standard landline based switched telephony systems. Thus cellular telephone users may connect with any landline telephone equipment or other cellular telephone users (coupled, in turn, to landline switched telephone networks through respective cell tower base stations).

In general, all such telephony communication systems are limited in two important respects. First, end user devices may communicate with one another only via a centralized server or network system (e.g., via respective cellular base stations and/or switched telephony networks). Landline telephony systems provide a network of switching devices to establish circuits between two or more end user telephone devices (or other data or voice communication devices). Cellular base stations atop cellular towers are required for cellular telephone users to establish connections with land based telephony systems or other cellular telephone users. If these centralized servers or networks are for any reason unavailable, no communication may be established between end users of the communication devices.

Secondly, to establish a call connection between two end user devices, a telephone number or other indicia (e.g., network address, ID, etc.) must be supplied to identify the other device with which communications are to be established. These indicia are static regardless of where the user is located and is required information to establish a call connection.

Radio frequency based communication systems such as citizens band ("CB") radios or simple "walkie talkie" radio devices do not require a centralized server or communication node but rather communicate directly from one end user's radio device to other user radio devices. However, radio communication systems do not generally provided for establishing a specific point-to-point call between one end user radio device and one or more particular, identified other end user radio devices. Rather, radio communication systems generally operate in a broadcast mode such that all users whose transceiver is tuned to a particular frequency or channel receive every transmission on that frequency or "channel". No private communication links may be established under such typical radio based communication systems. Although transmissions may be encrypted or scrambled, any radio device equipped with the proper decryption code and within transmission range can receive and decrypt the transmissions. No specific user or device may be identified in typical radio frequency based communication systems. Further, radio based communication systems generally do not provide for any protocol to establish the beginning of a call connection and the termination of an established connection. Radio communications are merely established by beginning transmission of a broadcast signal and ended when a user chooses to cease termination. Another weakness of radio based communication systems arises in that user data (voice or other data) is not encoded for spread spectrum high speed communications.

In a number of communication applications, it may be desirable or required to ensure continued communication capabilities without having to rely on a centralized server/network or communication tower. In an emergency scene response communication application or in a military combat communication application, it is important that the communication systems operate despite loss or failure of a central server/network or cell tower base stations. A communication system based on a centralized server/network or a cellular base station tower may be easily disabled by eliminating the central server or tower.

Further, it may be beneficial in many communication applications to permit establishment of a call connection (initiation of a call) to a specific device identified based on its geographical location (i.e., its physical proximity to the initiator of the call). Still further, in addition to location attributes to identify another communication device, it may be useful to identify a desired device for communication based upon other attributes of the user or the communication device.

For example, in a military context, it may be useful for military personnel in combat to be able to communicate with another soldier or other personnel based upon physical proximity to the initiator of the call. In other words, call "the closest reinforcements". There may be no simple way to identify a phone number or other identifying address for the "nearest" personal. Or, for example, it may be beneficial to initiate a call to the nearest personnel having particular attribute capabilities. In other words, call the nearest "EMT" personnel or call the nearest soldiers "with heavy artillery" or call the nearest "medic", etc. Presently known communication systems do not provide simple techniques for identifying such personnel or attributes of another communication device and do not provide mechanisms to directly set up communications with such identified devices.

Similarly, in another exemplary application of communication systems, first responders in a rescue or emergency operation such as fire fighters, emergency medical technicians, police, etc., may desire communication systems that locate the nearest personnel for assistance or the nearest personnel with particular capabilities. Similar to military applications as noted above, rescue or emergency operations in the context of a disaster such as earthquakes or the collapse of a building may be significantly hindered if a central server or communication tower is disabled by the disaster they seek to address.

It is evident from the above discussion that a need exists for an improved communication architecture providing mobility, reliability and location oriented identification of communication devices and users.

SUMMARY OF THE SOLUTION

The invention solves the above problems and other problems with improved methods and systems for proximity based communications. Proximity based communication systems and methods in accordance with features and aspects hereof may utilize radio frequency or other wireless transmission media and techniques to permit peer-to-peer communication between suitable proximity communication devices. Features and aspects hereof do not depend upon a centralized server/network or cellular base station towers that may be disabled. Further, features and aspects hereof do not require a user to identify the recipient of an initiated call by a phone number or any other static, pre-defined address indicia. Rather, the peer-to-peer proximity communication devices and methods hereof permit establishment of a call connection based principally upon geographical location (i.e., based upon proximity to the proximity communication device ("PCD") of the call initiator). Other features and aspects hereof permit location information for each PCD to be associated with other attribute data such that the recipient of an initiated phone call may be identified by proximity to the call initiator in combination with other attribute information. Still other features and aspects hereof combine proximity communication features within a PCD with standard cellular or other wireless communication protocols to permit both proximity communication capabilities and other prior radio or telephony communication protocols.

The PCD may be used strictly for voice communication, strictly for data communication, or for both voice and data communication. PCD features and aspects hereof may be applied for a variety of peer-to-peer communication applications including, for example, emergency site communications, secure site communications (such as emergency responders and military applications), ad hoc gaming connectivity with other PCDs used for game playing, etc.

Display features and aspects hereof provide the user with a display indicating location and distance of other PCDs in the system relative to the user's PCD. Display options may allow the user to "zoom" in or out to view a closer proximity range or a wider proximity range. Other display options allow a user to define filters defining desired features or attributes for any PCDs to be displayed (e.g., display only "Police" PCDs or display all "Supervisor" PCDs, etc.). Still further, other display features allow a user to select a particular PCD and request a display of other attributes of the selected PCD or its distance from the user's PCD, etc. Thus the PCD display may be presented as a sequence of levels or layers that permit the user to navigate among a plurality of different information displays.

One feature hereof provides a proximity communication device ("PCD"). The PCD includes a locator to determine the geographic location of the PCD. The PCD also includes a wireless transceiver for exchanging information between the PCD and other PCDs. The information exchanged includes location of all PCDs and includes user data. The PCD is adapted to establish a peer-to-peer connection with another identified PCD based on the location of the other identified PCD and the PCD is adapted to communicate with other PCDs by synchronizing exchanges using one or more synchronization channels transmitted through the wireless transceiver such that synchronization signals derived from one or more timing sources are transmitted on the one or more synchronization channels.

Another feature hereof provides a system that includes a plurality of proximity communication devices ("PCDs"). Each PCD further includes a locator to determine the geographic location of the PCD. Each PCD also includes a wireless transceiver for exchanging information between the PCD and other PCDs. The information exchanged includes location of all PCDs and user data. Each PCD of the plurality of PCDs is adapted to establish a peer-to-peer connection with another identified PCD of the plurality of PCDs based on the location of the other identified PCD. Each PCD is adapted to communicate with other PCDs by synchronizing exchanges using one or more synchronization channels transmitted through the wireless transceiver such that synchronization signals derived from one or more timing sources are transmitted on the one or more synchronization channels.

Still another feature hereof provides a method for proximity based communication. The method includes establishing multiple synchronization channels for use among a plurality of proximity communication devices ("PCDs") using wireless communication. The method also includes selecting one of the multiple synchronization channels for use in communications between a first PCD of the plurality of PCDs and a second PCD of the plurality of PCDs. The method then establishes at least one call connection between the first PCD and tie second PCD based upon location information exchanged between the first PCD and the second PCD. The call connection is synchronized utilizing the selected synchronization channel.

BRIEF DESCRIPTION OF THE DRAWINGS

The same reference number represents the same element on all drawings.

DETAILED DESCRIPTION

For the purpose of teaching inventive principles in the following discussion, some conventional aspects of the invention have been simplified or omitted. Those skilled in the art will appreciate variations from these embodiments that fall within the scope of the invention. Those skilled in the art will appreciate that the features and aspects described below can be combined in various ways to form multiple variations of the invention. As a result, the invention is not limited to the specific embodiments described below, but only by the claims that follow and their equivalents.

Figure 1:
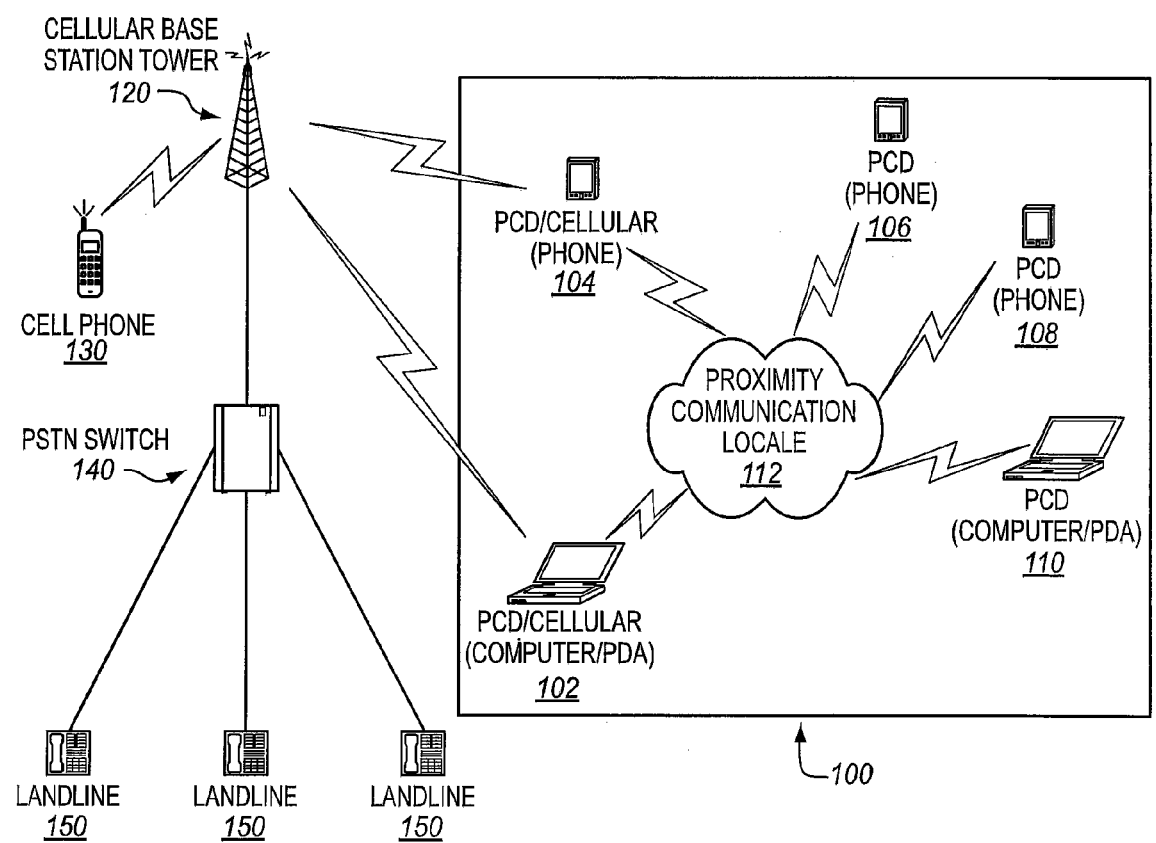
FIG. 1 is a block diagram of a proximity communication system embodying features and aspects hereof.

FIG. 1 is a block diagram of a proximity communication system 100 providing features and aspects hereof. System 100 may comprise any number of proximity communication devices. PCDs 104, 106, and 108 of FIG. 1 each represent proximity communication devices providing telephonic features for a user. Telephonic features as used herein refers to communication of voice and non-voice data between two appropriately configured telephonic PCDs. PCD 106 and 108 are configured to provide such telephonic features within the context of proximity communication system 100. By contrast, PCD 104 provides telephonic functionality within the context of proximity communication system 100 and also provides features to permit telephonic communication through well-known cellular telephony systems. PCD 104 therefore provides dual functionality to permit communication both in the context of proximity communication system 100 and standard cellular telephony through cellular base station tower 120.

In like manner, proximity communication system 100 may include PCD devices offering data processing and computing functionality. PCD 102 and 110 represent computing devices adapted for communication within proximity communication system 100. PCD 110 is adapted exclusively for communication within proximity communication system 100 while PCD 102 represents a dual capable computing device operable to communicate in a proximity communication system 100 as well as in a cellular communication structure such as cellular base station tower 120. PCD devices 102 and 110 are exemplary of devices that generally exchange non-voice user data. Laptop/notebook computers and PDAs are examples of such devices that primarily exchange non-voice related user data. Those of ordinary skill in the art will recognize the numerous equivalent devices capable of providing only voice data exchange, only non-voice data exchange or both voice and non-voice data exchange. For example, modern cellular telephonic devices are capable of exchanging both voice data and non-voice data with other similarly equipped devices. In like manner, PDAs or computers may exchange both non-voice data and voice data. The distinction between such devices has faded in importance and is at times irrelevant. Thus, those of ordinary skill and the art will recognize that any number and any variety of PCD capable devices may be utilized within exemplary proximity communication system 100.

Proximity communication system 100 permits identification of each PCD principally by its present location as distinct from a fixed telephone number or other fixed address indicia. As discussed further herein below, each PCD in proximity communication system 100 is capable of operating in a peer-to-peer mode to communicate with any other PCD in system 100. No centralized server or cellular base station is required for operation of proximity communication system 100. Rather, each PCD is made aware of all other PCDs in proximity communication system 100 and may establish private communication channels with one or more other PCDs in system 100. Each PCD is identified principally by its present location relative to each other PCD. As discussed further herein below, each PCD includes a locator component to determine its position. The position may be determined as an absolute geographic locations and/or a location relative to other PCDs in the system 100. For example, each PCD may include a global positioning system ("GPS") receiver or other absolute location determination means to establish an absolute location which may then be converted to relative location information to locate a PCD relative to other PCDs and/or to determine a location relative to other PCDs having a known absolute location—thus the relative location may be used to determine an absolute location.

Since each PCD establishes a peer-to-peer connection with one or more other PCD, there is no central server/network required to establish communication. Proximity communication locale 112 is not a central server or network but rather simply represents any geographical area defined by the transmission and reception range limitations of the particular wireless transceiver technologies utilized within PCDs 102 through 110 of system 100.

All PCDs 102 through 110 within system 100 exchange information during initialization and periodically thereafter to indicate their present physical position. The present physical position of a PCD may be determined by the PCD, for example, by global positioning system ("GPS") technology embedded within each PCD or by other locator means within each PCD. During initialization, each PCD determines its absolute location and communicates it (broadcasts it) to all other PCDs within the range of proximity communication locale 112. Each PCD therefore also receives broadcast location information from each other PCD so that it may determine the relative position for each of the other PCDs in the system 100. Such relative position information may therefore be used by a user to select one or more other PCD's with which a communication channel is to be established (i.e., with which a call connection is to be established).

As noted, each PCD may also include other locator means in addition to, or in the alternative to, GPS locator features. A PCD may include means for automatically determining a relative location—relative to another PCD whose absolute location is known (e.g., by use of GPS in the other PCD). For example, each PCD may include features for transmission and reception of a fixed strength, beacon signal. Any PCD may then determine its location relative to other PCDs by well known triangulation capabilities based on received signal strength ("RSS ") of the beacon signal from at least two PCDs. Such a relative location may then be converted to an absolute location by other means. For example, triangulating from one or more other PCDs that have GPS locator means allows a PCD without GPS to determine its absolute location by triangulating a relative position from the other PCDs whose absolute location is know. In addition to triangulation techniques using RSS, relative locator means may include well known time of arrival ("TOA") and differential time of arrival ("DTOA") techniques for determining relative location from another PCD having a known, absolute location. A wide variety of equivalent relative locator means structures and techniques are well known to those of ordinary skill in the art. Such relative location means may include any means that accesses information regarding relative distance of the PCD from a known absolute location such as another PCD or from that of a fixed landmark.

In addition, locator means may include manual entry locator means for user entry of an absolute location. A user may enter an absolute location such as a street address or other landmark designation that may be converted by commercially available databases into absolute coordinate locations. The manual entry locator means may also be adapted to permit direct entry by a user of an absolute coordinate position, e.g., manual entry by a user of known longitude/latitude/altitude absolute location information such as from a separate GPS unit not integrated with the PCD or other such indicators.

In accordance with features and aspects hereof, each PCD is mobile and may freely move about anywhere within the range of proximity communication locale 112. Further, a particular PCD may be identified by a user from another PCD based on location information only rather than requiring apriori knowledge of a telephone number or other address indicia. Those of ordinary skill in the art will also recognize that other identification information, in addition to present location, may be exchanged between the PCDs of system 100. Therefore, in accordance with features and aspects hereof, a user may also select one or more other PCDs with which to establish a call connection based on present location of the other PCDs and other attributes identified and associated with each PCD. For example, such other attributes may include capabilities associated with the location or available at the location of the PCD, name or other indicia associated with a user of another PCD, etc.

By contrast to proximity communication system 100, standard telephonic communication systems such as PSTN switch 140 and associated landline telephones 150 are restricted in their mobility and require identification of each telephone by a particular telephone number regardless of its present location. Cellular telephony systems represented as cell phone 130 coupled by wireless communication to cellular base station tower 120 provide mobility as compared to land line telephone systems but none the less require identification of a particular cell phone by its telephone number regardless of its present physical location. Landline telephony systems and cellular telephony systems also both require a centralized server or cell tower base station to permit communication between two landline telephones or between a cell phone and any other telephone device. Failure of the server/network or the cellular base station may render all associated telephone equipment unusable.

Proximity communication system 100 may utilize any of several well known, commercially available, wireless communication protocols and standards. For example, the 3rd Generation Partnership Project ("3GPP"—well known information available at www.3gpp.org) defines wireless transmission standards and associated protocols for establishing connections and associated channels and also defines a framework for the interconnection of the various protocols. For example, in accordance with 3GPP standards, PCDs may use spread spectrum encoding techniques to multiplex a number of logical channels of data on a common carrier frequency band. Code division multiple access ("CDMA") encoding techniques are one form of spread spectrum encoding and may be applied in PCDs to permit multiplexing of a variety of logical channels over a single, low power radio frequency carrier.

As will be discussed further herein below, such spread spectrum communication techniques permit a large number of logical channels to be defined within a single frequency band for radio frequency ("RF") transmissions. CDMA spread spectrum techniques generally define each channel by a digital code value used to encode (to spread) the data for a corresponding channel within a transmitted bitstream. The superposition of a plurality of such CDMA spread spectrum signal channels helps reduce the potential for intentional interference or eavesdropping because the superposition of multiple such channel signals results in a low power signal appearing virtually indistinguishable from background noise in the transmission medium. Only by knowing the specific code word for a particular logical channel can a receiver effectively isolate the intended channel data from the other superposed signals making up background noise relative to the desired channel. Such spread spectrum techniques and standards defined by 3GPP standards are well known to those of ordinary skill in the art and readily available for commercial use.

One particular feature of 3GPP standards useful in the proximity communication system features and aspects hereof derives from the definition of two forms or phases of encoding. A first form or phase of encoding is the channelization or channel separation encoding to effectuate the spread spectrum modulation of multiple logical channels multiplexed in a single frequency band. A second form or phase of encoding is referred to as scrambling or source separation in the context of 3GPP. Scrambling codes or source separation codes are used to define dedicated channels between a particular pair of PCDs that have an established call connection. The scrambling code defines such dedicated channels and, in conjunction with other secure communication techniques helps to further reduce potential for inadvertent or intentional eavesdropping or capture of transmitted data.

Still another aspect of 3GPP wireless standards useful in the context of a proximity communication system derives from the use of time division duplex or frequency division duplex to further multiplex information transmitted over a logical spread spectrum channel. Time division duplex ("TDD") or frequency division duplex ("FDD") paradigms may be useful in the context of PCD communication for segmenting full duplex uplink and downlink transmissions. These multiplexing techniques define "frame" boundaries and "slot" boundaries for segments of information to be exchanged. The communicating devices synchronize their respective exchanges to these defined frame and slot boundaries.

Those of ordinary skill in the art will recognize a wide variety of equivalent modulation and multiplexing techniques for providing wireless communications useful in the context of proximity communication features and aspects hereof.

Figure 2:
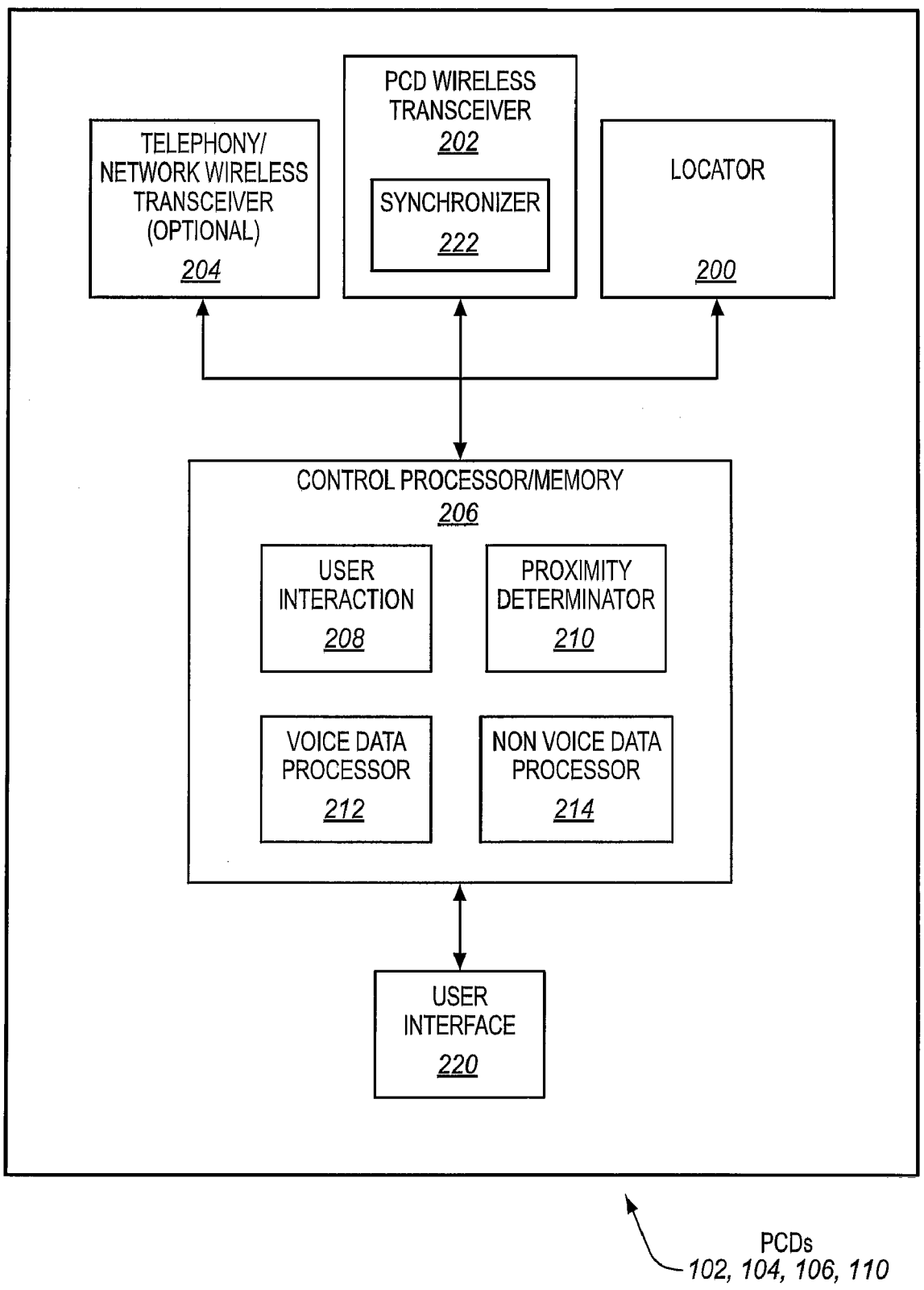
FIG. 2 is a block diagram of an exemplary proximity communication device in accordance with features and aspects hereof.

FIG. 2 is a block diagram describing an exemplary embodiment of a PCD. As generally noted above, a PCD may be any device that provides voice data exchange and/or non-voice data exchange utilizing peer-to-peer communication protocols in accordance with features and aspects hereof. An exemplary PCD (102-110 of FIG. 1) includes a locator element 200. Locator 200 is operable to determine the present absolute location of the PCD relative to the globe or relative to any other fixed point of reference defined by the specific locator technology. As noted above GPS or other well known locator structures and techniques may be employed by locator 200 to provide such location information. Devices and methods associated with such a GPS locator or other locating technologies are readily available and well known to those of ordinary skill in the art. In addition, as noted above, locator 200 may also represent suitable processing to permit manual entry of an absolute location of the PCD. Still further, the absolute location may be determined by locator 200 as a relative offset from one or more other PCDs whose absolute location is known. For example, locator 200 in a first PCD may be devoid of GPS features (or simply not presently receiving a GPS signal) but may determine its relative position with respect to other PCDs that have a known absolute location (e.g., from an operational GPS receiver therein). Such a determination may employ manual location entry means, triangulation means, TOA/DTOA means, etc.

An exemplary PCD also includes a wireless transceiver element 202 capable of transmitting and receiving data in accordance with the protocols and standards adopted for a particular proximity communication system. PCD protocols and standards may utilize any appropriate wireless communication modulation and protocol standards. Although a simple embodiment of such a dual function PCD may separate the cellular telephony communications in a different frequency band than that used for proximity communications, it may also be feasible to integrate the two communication systems in a common frequency band with separation based upon logical channel definitions.

Wireless transceiver 202 may also include synchronizer logic 222 for management and utilization of one or more synchronization channels used in the exchange of information between PCDs. As discussed further herein below, PCDs in accordance with features and aspects hereof may utilize one or more synchronization channels that carry synchronization information derived from one or more timing sources. Further, as discussed in additional detail herein below, one or more of the PCDs may generate and transmit such synchronization information. The synchronization information may be, for example, an un-encoded static bit pattern transmitted at predetermined time intervals. Thus any PCD that receives the synchronization information on such a synchronization channel may synchronize its use of frames and slots to transmit application related information (e.g., voice or other data) when transceiving over other defined channels between PCDs. Synchronizer logic 222 therefore represents processing to generate and transmit synchronization information from one or more PCDs over one or more predefined channels and derived from one or more timing sources.

An exemplary PCD may optionally include a cellular telephony or computer network wireless transceiver element 204 to permit dual functionality of the PCD both for use in the context of a proximity communication system and for use in other wireless communication applications such as wireless computing networks and cellular telephony. Such a dual purpose PCD may therefore allow communications both within a proximity communication system and in conjunction with other prior communication structures.

User interface 220 provides for presenting information to a user and for receiving user input. For example, an LCD or other display device may be included within user interface 220 for presenting information regarding its PCD and other PCDs within the proximity communication system. User interface 220 may include touch screens, pointer devices, voice input functions, and other well-known user interface functions and elements may also provide structure and functionality to receive the user input. For example, in a proximity communication system in accordance with features and aspects hereof, each PCD is identified to a user of another PCD by, at least, its relative location to the user's PCD. Such location information may be presented to a user, for example, by an icon or other graphical representation of each other PCD located on an LCD screen in a manner indicative of the devices relative location with respect to the users PCD. Further, a user may select one or more such other PCDs with which to establish a call connection through use of user input devices such as a touch screen, pointer or other well-known user input functions and devices.

Control processor/memory 204 provides overall control of the PCD through a number of functional elements including, for example, user interaction element 208, proximity determinator 210, voice data processor 212, and non-voice data processor 214. Numerous other control functions will be readily apparent to those of ordinary skill in the art. The representative functions are therefore intended merely as exemplary of significant aspects in operation of a PCD.

Control processor/memory 204 may be any suitable general or special purpose processor and associated program and data memory for storing and executing instructions to provide the depicted, exemplary functions (208-214) and other functions and features useful for wireless communication management. User interaction element 208 represents programmed instructions or other processing elements to interact with user interface element 220 providing output information to a user and receiving user input. Proximity determinator element 210 represents programmed instructions or other processing elements to interact with locator 200 to determine the PCD's present location and to interact with information received through wireless transceiver 202 representing location information of other PCDs in the system. Proximity determinator 210 therefore may determine the relative position of each other PCD relative to each user's PCD. Voice data processor 212 represents programmed instructions or other processing elements to transmit and receive human voice digitized information. The most common application of PCDs in a proximity communication system is to exchange voice information such as is common in telephony systems. Non-voice data processor element 214 represents programmed instructions or other processing elements to transmit and receive non-voice related digital data. PCDs including PDA or general purpose computing functionality may frequently exchange non-voice data while PCD elements providing primarily telephonic features may principally exchange voice data in their operation. However, as noted above, each device may be capable of exchanging both voice and non-voice data.

Those of ordinary skill in the art will readily recognize numerous equivalent architectures within the scope of the attached claims for components within a PCD. Those not adapted to provide the features and aspects of the present invention, various functional elements of a PCD are generally commercially available and well known to those of ordinary skill in the art. For example, locator 200, wireless transceiver 202, telephony transceiver 204, user interface 220 and processor 204 are well known commercially available components. Further, it will be recognized that numerous other functional elements may be present in an equivalent architecture to provide the above and other features and aspects.

Figure 3:
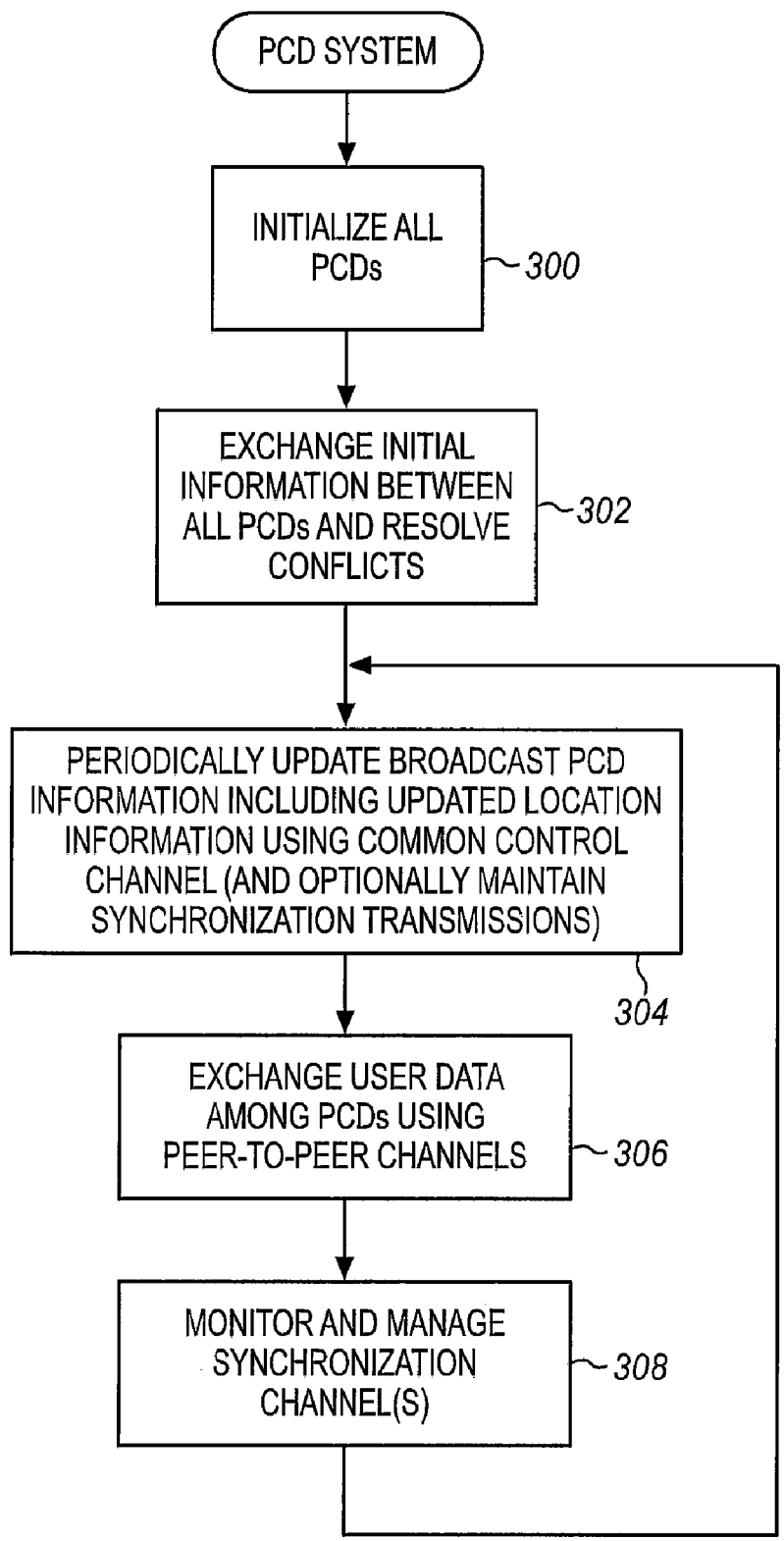
FIG. 3 is a flowchart describing exemplary operation of a proximity communication system as in FIG. 1 operable in accordance with features and aspects hereof.

FIG. 3 is a flowchart describing the overall operation of an exemplary proximity communication system. Element 300 represents processing within each PCD of the proximity communication system to initialize the PCD. In general, initialization of each PCD involves determining its location using GPS features or other locator components and techniques, generating a unique ID for each PCD to be used in protocol exchanges, generating spread spectrum channelization and scrambling codes for each PCD, establishing synchronization for exchanges between the PCDs, etc. Element 302 begins listening and broadcasting to exchange initial information among the PCDs initially within the proximity communication system. Such broadcast information may be applied to a channel associated with a predefined channel code known to all PCDs in the systems. In non-secure applications, this broadcast channel is predefined and known to all PCDs that may wish to participate in the proximity communication system. In secure applications (e.g., police, fire, military, etc.) this broadcast channel used to exchange initial information among the PCDs may be scrambled with further spread spectrum encoding techniques. An application specific scrambling code ("ASSC") known only to appropriately authorized PCDs may be used to scramble the broadcast information. Thus unauthorized users/PCDs will not be able to receive the broadcast information and thus will be practically unable to determine locations and even existence of other PCDs in the system.

Element 302 is also operable to resolve conflicts between PCDs that coincidentally selected an identical unique ID code. This ID, once conflicts are resolved, is used for the duration of the PCDs current operation (e.g., until reset or power is cycled). The ID is used by other PCDs in the system to correlate movement of this device and its icon for their respective displays. The ID is also used to associate scrambling codes with a particular PCD in establishing a call connection with another PCD and in exchanging information therebetween. Resolution of such conflicts may be performed in accordance with any of several well-known techniques. For example, each PCD that detects a conflict may randomly select a new ID that does not conflict with any other IDs in the received broadcast information. As each PCD listens for information being broadcast from the other PCDs it builds a table with of information regarding each PCD in the proximity communication system. Further details of initialization of each PCD are provided herein below with respect to FIG. 4.

New PCDs may periodically join the proximity communication system or may drop out of the proximity communication system as new users arrive and depart the locale in which the proximity communication system is operating. Element 304 therefore represents processing to periodically update the PCD information for each PCD in the proximity communication system. The periodically updated information to be broadcast may include, for example, an updated current location for each PCD, the unique ID for each PCD, spreading and scrambling code values, etc. The updated information may be periodically broadcast over a control channel such that every PCD may receive the information by listening to the same control channel. As noted above, this broadcast information may be scrambled using a pre-determined ASSC so that only an authorized subset of PCDs at a locale may descramble the information using the ASSC.

In addition to periodically updating information exchanged between the various PCDs, in element 304 each PCD performs processing to maintain synchronization with the control channel used for broadcasting information as well as for initially establishing desired call connections. As discussed below, numerous approaches may be employed to establish and maintain synchronization among the plurality of PCDs.

Element 306 then proceeds with normal operation of the system for exchange of user data among two or more PCDs these using the peer-to-peer channels defined in accordance with features and aspects hereof. As noted above, initialization of the system entails establishing one or more synchronization channels for broadcast of synchronization information generated by one or more PCDs derived from one or more timing sources. Since PCDs may enter and leave the proximity system over time, it is useful for each PCD to monitor the synchronization channel(s) to assure the continuous availability of required synchronization information. Element 308 is therefore operable to periodically monitor and manage the synchronization channels to assure continued availability of the requisite information. Those of ordinary skill in the art will recognize that the desired monitoring may also be implemented as an interrupt or event driven process so that changes in the system related to generation and utilization of synchronization information may cause an interrupt or event to trigger processing of element 308. After some period of time exchanging user data or in response to receipt of new broadcast information from another PCD, processing continues looping back to element 304 to periodically update the PCD information exchanged between the various PCDs of the proximity communication system.

Figure 4:
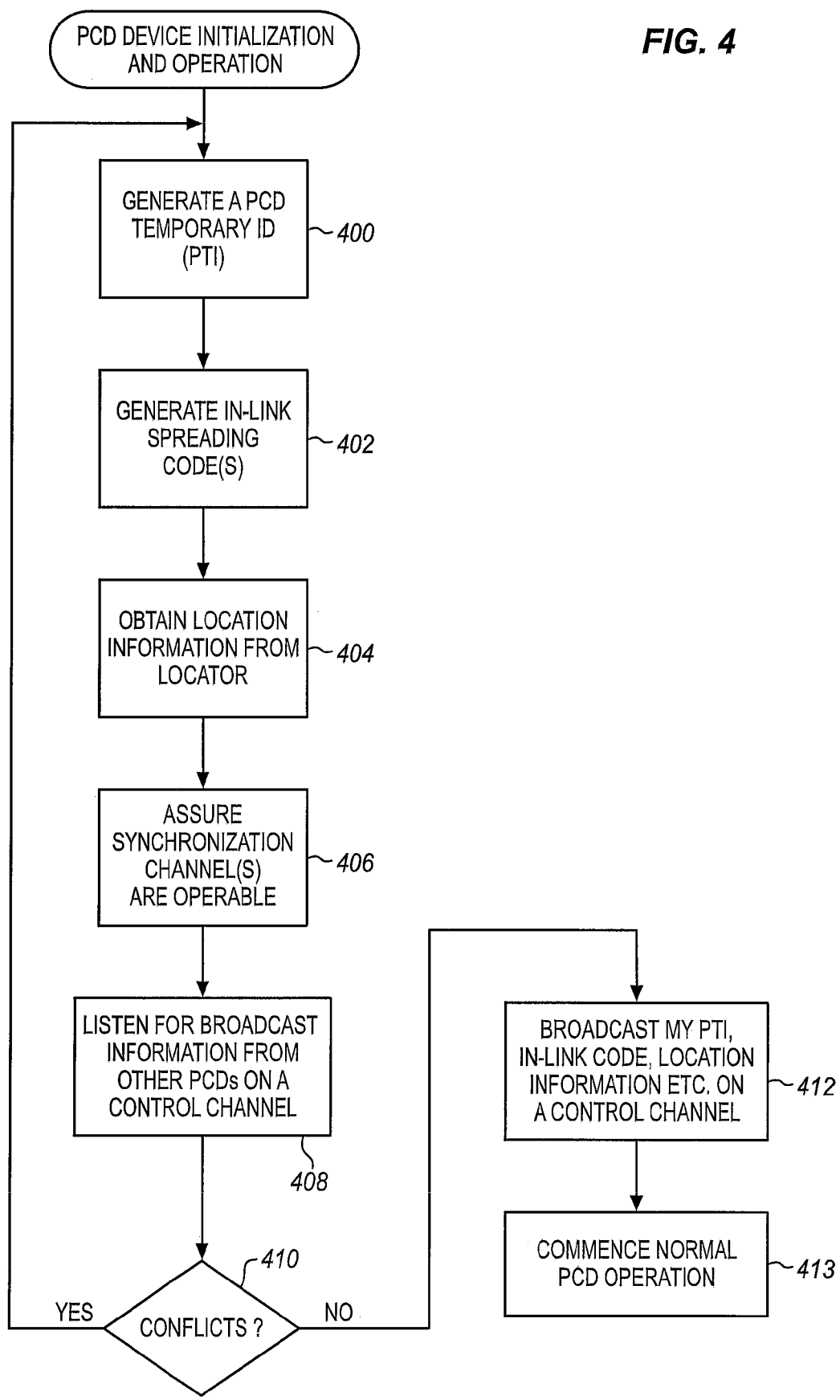
FIG. 4 is a flowchart describing exemplary methods operable in a proximity communication device as in FIG. 2 to initialize the device in accordance with features and aspects hereof.

FIG. 4 is a flowchart describing additional details of initialization of an individual PCD in the context of a proximity communication system. Element 400 is first operable to generate a unique PCD temporary ID ("PTI"). The PTI may be useful in protocols used for exchanging information between multiple PCDs. In particular, the PTI may be useful as an index to locate other information regarding a particular PCD from a table of entries regarding the system of PCDs. Element 402 then generates one or more In-Link scrambling codes—a scrambling code as used herein may also be understood to be a spreading code as the term is defined in 3GPP standards. A first set of codes may be defined for "channelization"—spreading codes are generally defined to "spread" data over a transmission signal. Channelization codes in accordance with 3GPP standards define a standard set of channels used by all communication devices in a system. Further spreading codes may define further channel or subchannel definitions. In essence, "scrambling codes" as the term is used herein are simply additional spreading codes used for different purposes. In the context of proximity communication systems in accordance with features and aspects hereof, the scrambling codes define specific channels to be used in an exchange between a corresponding pair of peer-to-peer communicating PCDs. Further source separation is achieved by second phase scrambling that separates the communication between pairs of communicating PCDs. Element 402 is therefore responsible for generating first phase scrambling codes for this PCD for communication over dedicated channels with this PCD. Alternatively, as noted herein below, source separation codes for a particular communicating pair of PCDs may be generated by processing associated with establishing the desired call connection.

Element 404 next interacts with the locator element within the PCD to obtain location information regarding the initial location of the PCD. As noted above, the locator may be a GPS receiver or other well known techniques to determine a location. As is generally known in the art, GPS receivers receive information that identifies an absolute geographic location on the planet for the receiving device. Other techniques such as triangulation of beacon signals (RSS), TOA, and DTOA may be employed to determine a relative location—relative to other PCDs in the system at least one of which has a known absolute location. Thus the relative position of a PCD may be used to derive its absolute location. Alternatively, the initial location may be determined as any other location coordinates including relative locations relative to some nearby fixed reference point. The initial location may therefore also be a relative location relative to some reference point. Such a relative location may be established by element 402 by any of a variety of electronic means as above or may be established by manual input from an operator of the PCD indicating the absolute or relative location of the PCD.

In order for all PCDs to exchange initial information in preparation for normal operation, all PCDs may be synchronized to utilize a common control channel available to each PCD (e.g., encoded with a spreading code known to all PCDs). At initialization, each PCD may synchronize its bitstream for that predefined control channel. Well known frame and slot level synchronization techniques as defined in the 3GPP standards may be applied to the PCD synchronization processing of step 406. In general, one or more synchronization channels ("SCH") may be defined hi the carrier transmission, each synchronization channel providing synchronization information such as an un-encoded predetermined bit sequence. This un-encoded bit stream is repeated at fixed, predetermined intervals such that each PCD may synchronize frame and slot boundaries thereto. Such synchronization techniques as defined in the 3GPP standards are common and well known in the context of cellular telephony. However, unlike cellular telephony, proximity communication systems in accordance with features and aspects hereof do not rely on a central server or cellular base station to provide the synchronization channel stream. Rather, in accordance with features and aspects hereof, one or more PCDs during initialization listen to the defined synchronization channels to determine if any other PCD has begun transmitting the synchronization information (e.g., synchronization bit pattern). If no synchronization channels are presently transmitting synchronization information, the first PCD to achieve this level of initialization commences transmission of the standard synchronization bit pattern on an un-encoded synchronization channel. Each subsequent PCD proceeding through initialization will then detect another PCD already transmitting the synchronization sequence. Subsequent PCDs initializing may then synchronize to the first PCDs synchronization channel transmissions.

Since PCDs may enter and leave the proximity system, it may be advantageous for each PCD to generate and transmit the same synchronization information. Thus, if any one or more PCDs leave the system, the remaining PCDs will be assured of having a continuing source of synchronization information. Alternatively, each PCD may simply monitor the synchronization channel so as to assure continued transmission of synchronization information generated form at least one of the PCDs of the system. When a PCD detects that the synchronization channel is no longer transmitting synchronization information, the first to so detect may assume the responsibility and commence generation and transmission of such information. More generally, any number of the PCDs in the system may join in the transmission of the same synchronization information on the PCD SCH channel. One, all, or any predetermined maximum number of PCDs may participate in the generation and transmission of synchronization information. Still further, multiple synchronization channels may be provided. For example, in accordance with 3GPP protocols, a first synchronization pattern on a channel may provide frame synchronization while a second channel may provide synchronization information for slot synchronization within a frame. Still further, each PCD may generate synchronization information from any of multiple timing sources. For example, a PCD that is equipped with GPS locator features and presently has access to a GPS signal may generate synchronization information derived from timing signals of the GPS signaling standards. Alternatively or in addition, timing signals derived from clock signals and circuits within each PCD, and therefore common to all PCDs in a proximity communication system, may be used to generate synchronization information.

In one exemplary embodiment, synchronization information may be transmitted on multiple synchronization channels. One or more synchronization channels may transmit synchronization information derived from GPS signals received by the GPS receiver in suitably equipped PCDs while one or more synchronization channels may transmit locally derived synchronization information derived from a local timing source within each PCD. Therefore, PCDs wishing to establish a call connection may use any of the multiple synchronization channels that are available to both of the PCDs engaged in the call connection. For example, if any PCD in a desired call connection is GPS equipped and has access to a GPS signal to permit GPS derived synchronization information generation, the PCDs of that connection may use either the GPS derived synchronization information on one channel or may use the locally derived synchronization information on another channel. If instead, neither of the two PCDs desiring a call connection has GPS capability, or at least has no GPS signal available to assure generation of GPS based synchronization information, the two PCDs may utilize only the locally derived synchronization information on an appropriate channel. Details of an exemplary method for determining the synchronization channel to use in a call connection are discussed further herein below.

With the PCD synchronization established to enable use a common control channel, element 408 is then operable to listen on a control channel for broadcast information from other PCDs in the proximity communication system. All PCDs may first listen for broadcast information for a period of time during initialization to obtain information about other PCDs in the communication system. As information broadcast from other PCDs is received, the information may be recorded in tables or memories associated with this PCD for later use. The tables may be indexed using the PTI of each PCD (e.g., the broadcast ID adopted by each PCD as part of its initialization) to allow rapid access to the broadcast information of each PCD.

After a period of time listening for broadcast information from other PCDs, element 410 will determine whether any conflicts are detected in the generated initial information for this PCD and that of any other PCD received in the broadcast information. Conflicts may be detected in the PTI value (ID value) generated for this device or may be found in the spreading codes generated for use in transmissions to this PCD. If element 410 detects a conflict in this initial information, processing loops back to element generate new PTI and spreading codes and them listen again to detect any new possible conflicts.

When element 410 detects no conflict, element 412 broadcasts the initial information for this PCD on a common control channel—i.e., a logical broadcast channel defined in the spread spectrum transmissions and shared by all PCDs to exchange such information. The broadcast information may include the PTI and the In-Link spreading codes generated for the initializing PCD as well as initial location information derived from tie locator component of the PCD. Element 414 then commences normal operation of the PCD having completed initialization. Normal operation may continue periodic broadcasts of the updated current location information as well as the initial PTI and spreading codes generated above. Further details of exemplary normal operation are provided herein below with respect to FIG. 5.

As noted above, multiple synchronization channels may be defined among the various PCDs in a system. Further the multiple channels may provide timing or synchronization information derived from any of multiple timing sources. As noted above, some or all of the PCDs may include GPS features. GPS features, in addition to providing accurate location information (via longitude, latitude and altitude), are known to provide an accurate timing signal that may be relied upon worldwide for many timing synchronization purposes. One synchronization channel may therefore carry GPS derived synchronization information so long as at least one PCD in the system is GPS equipped and is presently receiving GPS signals. Another synchronization channel may carry locally derived synchronization information—derived from clock circuits local to every PCD of the system. Thus one or more synchronization channels may be available to PCDs wishing to establish a call connection. Where all PCDs engaging in a call connection (typically two devices in a peer-to-peer connection) sense the presence of GPS derived synchronization information on a corresponding synchronization channel, the two devices may use either the GPS derived or locally derived synchronization information on the available synchronization channels. If any of the PCDs wishing to establish a call connection do not sense any GPS derived synchronization information, the PCDs will establish a call using only the locally derived synchronization information. This locally derived synchronization information is, in essence, a least common source of synchronization information. The PCDs may then also monitor the other synchronization channels to determine if more accurate GPS derived synchronization information becomes available.

Figure 10:
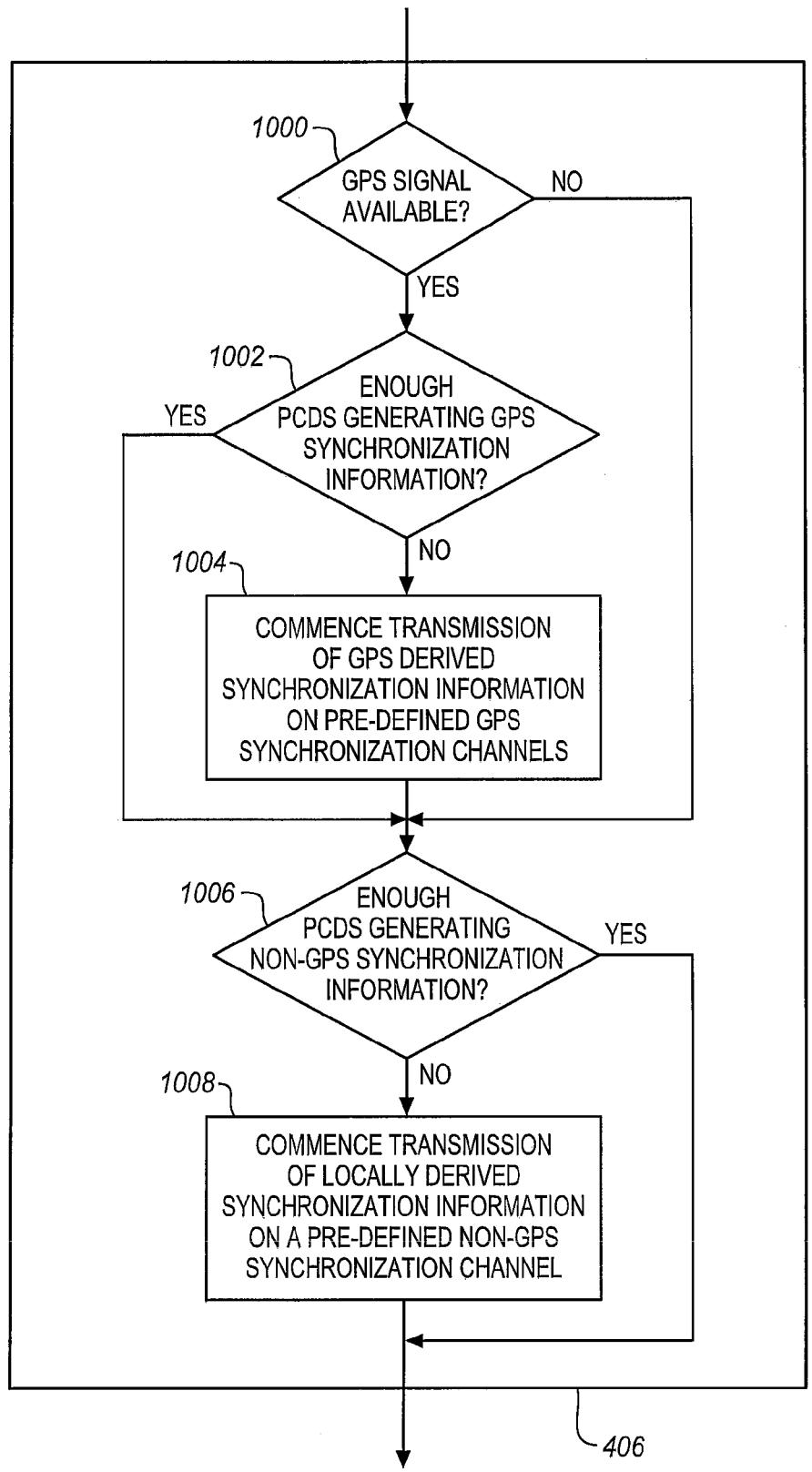
FIG. 10 is a flowchart providing additional details of an exemplary channel synchronization protocol in accordance with features and aspects hereof.

FIG. 10 is a flowchart describing additional details of the processing of element 406 of FIG. 4 to establish synchronization channels among the plurality of PCDs in the system. More specifically, FIG. 10 (element 406 of FIG. 4) is operable in initialization of each PCD in the system. Further, those of ordinary skill in the art will recognize that such synchronization channel initialization may be repeated any as the system is used to assure establishment of proper synchronization channels. For example, if devices enter or leave the system or acquire or lose reception of GPS signals, the generation and use of synchronization information may need to be re-initialized.

Element 1000 is first operable to determine whether this PCD has GPS features and is presently receiving a GPS signal. If not, processing continues with element 1006 below.

If this PCD is GPS equipped and has access to a GPS signal, element 1002 is next operable to sense whether a sufficient number of other PCDs have already commenced transmission of GPS derived synchronization information on the pre-defined GPS synchronization channels. As a matter of design choice, all PCDs or any predetermined maximum number ("N") of the PCDs may be responsible for generating GPS derived synchronization information for use by the PCDs in the system. If a sufficient number (N) of PCDs are generating and transmitting GPS derived synchronization information, processing continues with element 1006. If an insufficient number (N) of PCDs are presently generating GPS derived synchronization information, element 1004 is operable to commence such generation and transmission of GPS derived synchronization information on an appropriate, pre-defined, GPS derived synchronization channel. Processing then continues with element 1006.

As noted, any number of PCDs may also transmit locally derived synchronization information on corresponding, pre-defined non-GPS derived synchronization channels. Locally derived synchronization information may be generated from local timing source signals (e.g., a clock or timer circuit of other clock signal circuits within every PCD). As above, all PCDs or any predetermined maximum number ("N") of the PCDs may be responsible for generating non-GPS derived (locally derived) synchronization information for use by the PCDs in the system. Element 1006 is then operable to determine whether a sufficient number of PCDs have commenced transmission of locally derived synchronization information. If a sufficient number of PCDs are already generating the non-GPS synchronization information, this PCD need not do so and element 406 processing completes. Otherwise, element 1008 is operable to commence transmission of locally derived (non-GPS derived) synchronization information on a corresponding synchronization channel.

Those of ordinary skill in the art will recognize that any number (N) of PCDs may be intended to generate the synchronization information (either GPS derived or locally derived). The determination of "N" may be a design choice for the needs of a particular application of the PCDs. If N is "1", the first PCD to reach that level of initialization will start generating and transmitting the desired synchronization information. However, if that PCD leaves the system, synchronization could be temporarily lost until some other PCD senses the absence of synchronization information and re-initializes to start generation and transmission of the desired synchronization information. Thus it may be preferred in some exemplary applications to permit multiple PCDs to generate and transmit desired synchronization information. Where multiple PCDs are allowed to generate and transmit the synchronization information, the first PCD to do so establishes an arbitrary start for the periodic synchronization information transmission. Second and subsequent PCDs will sense the presence of transmitted synchronization information and will join in the generation and transmission substantially aligning its periodic transmissions with that of the first PCD. Thus the substantially aligned, multiple transmissions of the synchronization information (i.e., an un-encoded bit sequence) will not interfere with other transmissions. Rather, the multiple transmissions will be minimally interfering with one another or even additive in the resulting radio frequency modulated signal representing the synchronization information. Where the multiple PCDs are all generating and transmitting GPS derived synchronization information, they may all agree by design to transmit the desired information at a designated time (e.g., at that start of each second, etc.).

As discussed further herein below, establishment of a call connection may select an appropriate synchronization channel from among the plurality of synchronization channels. Further, the availability of synchronization information on synchronization channels may vary over time such as when PCDs enter or leave the proximity communication system area or GPS signals are lost for GPS equipped PCDs. For example, if no PCDs remain in the system that have GPS features or have access to GPS signals, all PCDs in the system will have to rely solely on the locally derived synchronization channels in establishing call connections. Thus when establishing a call connection, the PCDs desiring the connection will determine at that time the preferred synchronization channel to rely on, preferably for the duration of the call.

Figure 5:
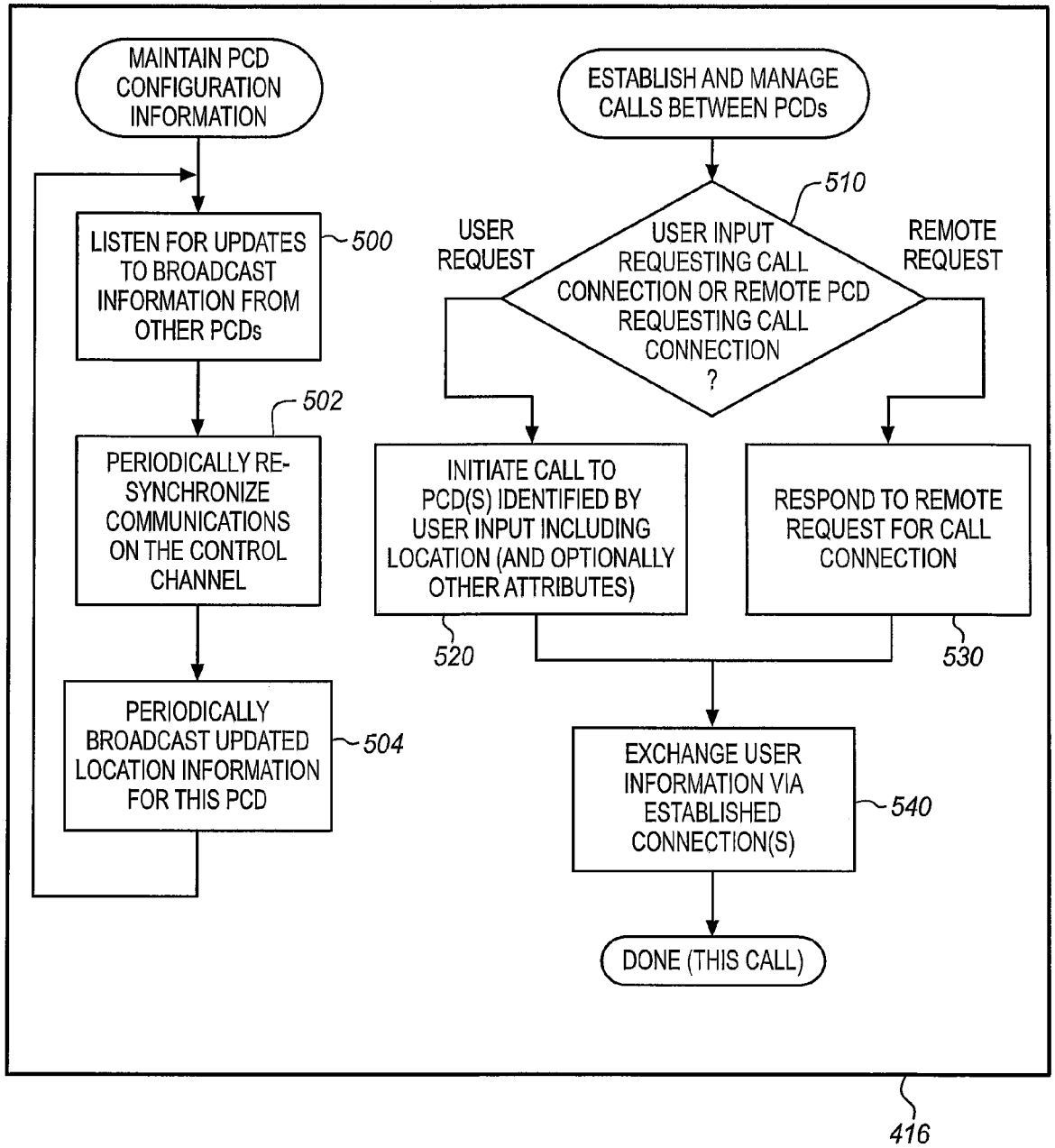
FIG. 5 is a flowchart describing exemplary methods operable in a proximity communication device as in FIG. 2 to normally operate the device to update information in the system and to establish call connections in accordance with features and aspects hereof.

FIG. 5 describes two methods operable substantially in parallel and in combination representing exemplary normal operation of a PCD following completion of initialization. A first method represented by elements 500 through 504 maintains synchronization for communication on the control channel and also updates user equipment broadcast information ("UBI") regarding location and other parameters associated with each PCD in the proximity communication system. A second method in FIG. 5 operable substantially in parallel with the first method is represented as elements 510 through 540 to allow establishment of call connections between this PCD and one or more other PCDs in the proximity communication system.

Elements of 500 through 504 represent a method operable in an initialized PCD to maintain synchronization and to update exchanged broadcast information on a control channel shared by all PCDs in the proximity communication system. Element 500 is operable to listen for updates to the broadcast information from other PCDs. As noted, new PCDs may join the proximity communication system from time to time. Element 500 is therefore operable to listen to the control channel for such broadcast information regarding new PCDs and to detect the absence of broadcast information from PCDs previously participating in the proximity communication system. As information is derived from listening for broadcast updates by element 500, tables within the PCD are updated to reflect the updated broadcast information. Element 502 is then operable to periodically re-synchronize communications on the control channel. As noted above, in a proximity communication system in accordance with features and aspects hereof, there is no central server or cellular base station to maintain synchronization for all communication devices. Rather, all or any number of the PCDs participating in the proximity communication system transmit at scheduled intervals the locally derived synchronization pattern on one or more synchronization channels of the system. One or more other PCDs that are GPS equipped (and are presently receiving GPS signals) may also generate and transmit at scheduled intervals the GPS derived synchronization information on corresponding channels. As new PCDs are added to the communication system and undergo initialization or as devices leave the system, it is assured that there is always an appropriate number of PCDs generating the necessary synchronization information to permit ongoing operation. Thus, element 502 is operable in each PCD to monitor the presence of required synchronization information on corresponding synchronization channels and to re-initialize operation of synchronization channels as required in response to changes in the system.

Element 504 is then operable to periodically broadcast updated location and other information from this PCD to all other PCDs and the proximity communication system. The broadcast information is transmitted on a control channel so that other PCDs listening for such updated broadcast information may receive the information on the control channel. Processing then continues looping back to element 500 to continuously iterate through listening for updated information, maintaining synchronization on the control channel, and periodically updating location and other information regarding this PCD.

As noted above, the broadcast of element 504 may also be encoded using an application specific scrambling code in secure applications. Every PCD in such secure application will know the pre-determined application specific scrambling code to allow decoding of the broadcast information. Unauthorized users or devices will be practically incapable of decoding such scrambled, broadcast information. Additional well known security techniques may be employed to secure the broadcast from eavesdropping by other PCDs in the system that should not be permitted to eavesdrop on certain information in the system. For example, pre-defined, application-specific scrambling codes may be defined as having a tree structured relationship with one another or other hierarchical relationship. A device using a particular application-specific scrambling code defined in such a hierarchical structure is understood to have security clearance or permission to use that code plus any other hierarchically lower in the structure. Scrambling codes that are hierarchically higher in such a structure are not permitted for use by that PCD and may remain unknown to that PCD. Thus, for example, emergency first responder, military, or other high security applications of the proximity communication system features hereof may provide secure channels of communication that roughly mirror the hierarchical structure of the organization and its security. Thus higher level managers or officers at a site maybe assigned a hierarchically higher application specific scrambling code such that that PCD can also descramble all the broadcast information that uses hierarchically lower scrambling codes. However, lower level workers, officers, or soldiers at a site may be assigned a hierarchically lower application specific scrambling code for their broadcasts and thus will not be permitted to descramble the broadcasts of their superiors at the site.

Substantially in parallel with the method described above, elements 510 through 540 are operable to manage the call connection process. Element 510 is first operable in response to detecting some event requesting establishment of a new call connection between this PCD and one or more other PCDs. Element 510 determines whether the detected event is a request from a user of this PCD to make a call connection with one or more other PCDs or whether the detected event is a request from a remote PCD attempting to establish a call connection with this PCD. If the request is a user request, element 520 is operable to initiate a call connection process to the PCD identified by the user input based upon location information and optionally identified by other attributes of the identified PCD. As noted above, user input to request such a call connection may typically be in the form of selecting a PCD based upon location information associated with each PCD in the proximity communication system. Other attributes such as capabilities or features associated with the PCD, a username or other identification associated with the user of the PCD, etc., may be included as other selection criteria in the user's selection process. Further, the user may select multiple PCDs with which a call connection is to be established. Multiple selected PCDs may receive identical data transmissions (voice or non-voice data) from this PCD by a multicast or duplicate transmission to each of the multiple selected PCDs.

Once element 520 has completed establishing the requested call connection to one or more other identified PCDs, element 540 is then operable to exchange user data via the established connections. Communication with multiple PCDs may involve duplicating the transmitted data to each of the multiple PCDs connected to this PCD by operation of element 520. When element 540 has completed its exchange of user information or data, a final message may be sent to all PCDs involved in the established connection or connections to request tearing down of the establish connection. Tearing down an establish connection entails freeing the various private communication channels established by operation of element 520.

If element 510 determines that the detected event is a request from a remote PCD to establish the call connection with that remote PCD, element 530 is operable to appropriately respond to the remote request for a call connection. Having thus established the requested call connection, element 540 is then operable as discussed above to commence exchange of user information or data via the established logical channels of the connection. As noted above, upon completion of all user data exchange, a final tear down message may be sent to the logical channel to release logical channels and other resources consumed or defined by establishment of the channel connection.

Those of ordinary skill in the art will recognize that dedicated logical channels used to communicate between this PCD and one or more selected PCDs may be established by generating scrambling codes in element 520 at the time of selecting the PCDs with which to communicate. Regardless of when the scrambling codes are defined, the codes are exchanged between the PCDs to be connected in a call as part of the call connection setup exchange. These exchanges define the logical channels to be used for each communicating pair of PCDs.

Figure 6:
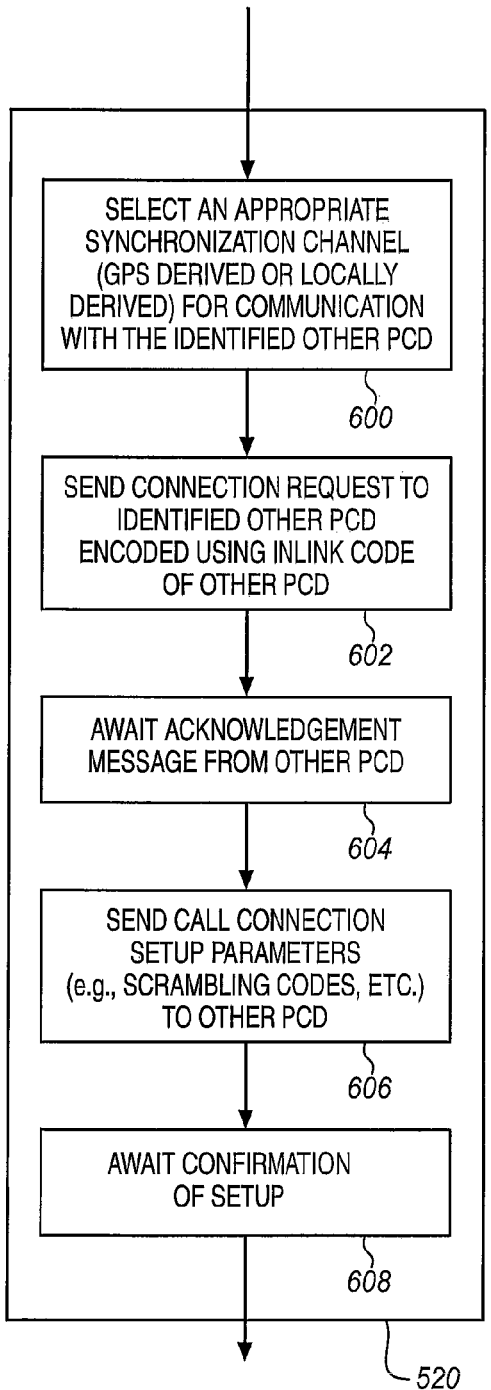
FIG. 6 is a flowchart providing additional details of an exemplary call management and processing protocol in accordance with features and aspects hereof.
Figure 7:
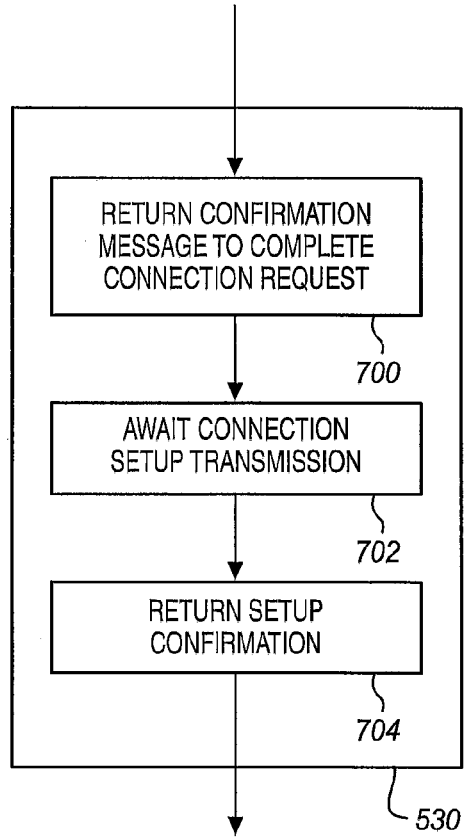
FIG. 7 is a flowchart providing additional details of an exemplary call management and processing protocol in accordance with features and aspects hereof.
Figure 8:
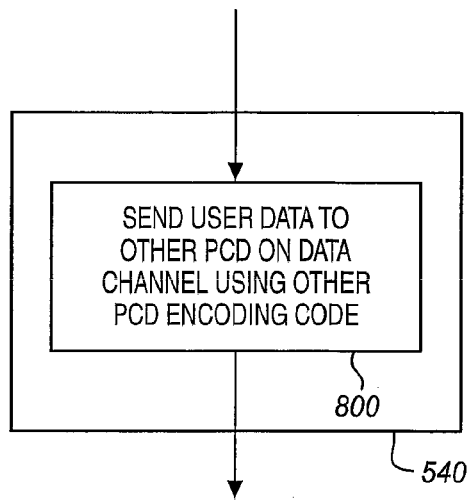
FIG. 8 is a flowchart providing additional details of an exemplary data exchange in an established call in accordance with features and aspects hereof.

FIGS. 6, 7, and 8 provide additional details regarding the operation of elements 520, 530, and 540, respectively. FIG. 6 provides additional details regarding the operation of element 520 (of FIG. 5) operable in a first PCD to establish a call connection to one or more other PCDs. Element 600 is first operable to select an appropriate synchronization channel for establishing a call connection to one or more identified other PCDs. As noted above, any number of the PCDs in the system may include GPS features and, if they are receiving GPS signals, may have established a GPS derived synchronization channel. In all cases, one or more PCDs in the system have established a locally derived synchronization channel. One or more of these various synchronization channels may be usable by the PCDs to be connected in this call connection. If both devices sense the presence of the GPS derived synchronization information, then any of the synchronization channels may be selected for this call connection. If any of the PCDs to be connected in the call do not presently sense the GPS synchronization information in the system, then the locally generated synchronization information will be used in establishing this call connection. Where a PCD will be establishing multiple connections (e.g., a three way call connection or, in effect, a "multi-cast" to multiple PCDs, different synchronization channels may be used in each of the multiple call connections.

Using the selected synchronization channels, element 602 sends a connection request to each of the one or more identified other PCDs. The connection request message is encoded using the In-Link spreading code of each identified other PCD. The In-Link scrambling code from each other PCD may be determined based upon the table of information stored within this PCD and gathered by applying an application specific scrambling code to the broadcast information during initialization of PCDs in the proximity communication system. As noted above, if multiple PCDs are identified for establishing call connections, element 600 transmits a connection request to each such PCD to request a peer-to-peer connection with each other identified PCD. Element 604 then awaits receipt of an acknowledgement message from each other PCD to which a request was sent indicating acceptance of the request. This message may be scrambled using the In-Link scrambling code of the first or requesting PCD. As noted above, the In-Link code of each PCD may be included in the initially broadcast information regarding each PCD. Element 606 then sends a connection setup message to each of the other PCDs that have acknowledged the connection request. The setup message provides various parameters of the desired connection so that both this PCD and each identified other PCD may configure the communication layers for proper operation during the establish call connection. Lastly, element 608 awaits reception of a setup confirmation message from each identified other PCD confirming proper configuration of the requested call connection. Thus this PCD (operating the method of element 520) has established a requested call connection with each of the one or more identified other PCDs. Those of ordinary skill in the art will readily recognize useful error recovery procedures should any aspect of the exchange fail to establish the desired connections.

As noted above, a PCD may establish multiple call connection for a particular communication exchange—e.g., in effect a multi-party call connection or a "multi-cast" involving multiple PCD call connections. The PCD establishing the multiple connections repeats the steps above for each desired call connection. Logical channels are established between this initiating PCD and each of the other PCDs. Synchronization channels are selected for each such call connection.

FIG. 7 is a flowchart describing additional details of the operation of element 530 of FIG. 5. FIG. 7 describes a mirror image of the exchange call connection exchange described above with respect to FIG. 6. FIG. 7 represents the processing within each identified other PCD with which another PCD is attempting to establish a call connection. Element 700 is operable in response to receipt of a call connection request message to return a confirmation/acknowledgment message to the requesting PCD indicating ability to establish a desired call connection. If the PCD is presently unable to establish the requested call connection (e.g., busy with other tasks or exchanges, or configured by user input to reject requests from one or more identified PCDs, etc.), a rejection message (not shown) may be returned or the request may simply be ignored. Element 702 is then operable to await a connection setup message from the requesting PCD to provide parameters of the requested call connection. Lastly, element 704 is operable to configure the required protocol layers in accordance with the connection setup message and to return a setup confirmation message to the requesting PCD to indicate successful establishment of the requested connection. Having so successfully completed the connection request, the first and second PCDs may commence exchange of user data as described above.

FIG. 8 is a flowchart describing additional details of the operation of element 540 of FIG. 5. Element 800 is first operable to send user data to another PCD having a data channel established in response to the request and confirmation return messages in FIGS. 6 and 7 above. The exchange of user data by element 800 is performed on a data channel associated with the initiating PCD. The scrambling codes generated and exchanged between the communicating PCDs are used to encode the transmissions to each PCD. Where multiple call connections are requested and established, element 800 represents the exchange of data duplicated over multiple dedicated channels between the various multiple pairs of connected PCD pairs. Further, as noted above, upon completion of the exchange of user data, element 800 may also operate to transmit a tear down message to the PCDs involved in established connections. The tear down message is processed by each receiving PCD by the deallocating resources allocated for the call connection.

The processing of FIGS. 6-8 represent a simplified call processing message protocol to establish and terminate a call connection between two PCDs. Those of ordinary skill in the art will recognize that any suitable call processing messaging protocol may be employed in the proximity communication system hereof. A call processing protocol provides a number of messages for establishing and destroying a call connection between a PCD and one or more other PCDs. For example, standard cellular telephony call processing protocols as well as standards published by 3GPP provide such call processing messaging protocols. Though these standard call processing protocols are rich with features not needed in the proximity communication features and aspects hereof, simplified subsets of these standard protocols may be used to provide useful call connection processing features and aspects hereof. As a matter of design choice, these standard protocols may be used or modified or a customized protocol structure may be developed.

3GPP and other telecommunication standards define a number of logical and physical channels useful in the call processing protocols. Several of these standard channel definitions may be useful in the proximity communication features and aspects hereof. The following 3GPP standard logical and physical channels are exemplary of channels that may be useful in implementing call processing protocol exchanges in accordance with features and aspects hereof:

| CHANNEL | USAGE |
|---------|-------|
| BCH | Broadcast Channel |
| CCCH | Common Control Channel |
| DCCH | Dedicated Control Channel |

-continued

| CHANNEL | USAGE |
|---------|-------|
| DCH | Dedicated Channel |
| DPCCH | Dedicated Physical Control Channel |
| DPCH | Dedicated Physical Channel |
| DPDCH | Dedicated Physical Data Channel |
| DTCH | Dedicated Traffic Channel |
| PCCPCH | Primary Common Control Physical Channel |
| SCCPCH | Secondary Common Control Physical Channel |
| SCH(N) | Synchronization Channels (1-N) |

In general, a control channel is used to exchange commands and control information between two PCDs while a data or traffic channel is used to exchange application or user data (i.e., voice data and non-voice data in the proximity communication system). Control and other standard channels may be encoded using channelization codes as generally defined by 3GPP and other standards. In general, dedicated channels are encoded using the source separation or scrambling code associated with the receiving PCD in a requested or established connection. Non-dedicated channels utilize a channelization code known to all PCDs of the system and may thus be shared by all PCDs. The synchronization channels (SCH(1) . . . SCH(N)) and broadcast channel (BCH) are examples of un-encoded non-dedicated channels shared by all PCDs in the proximity communication system hereof. The SCHs may be used for a periodic transmission of a standard synchronization bit patterns. The BCH channel may be used to broadcast location and other information about each PCD for consumption by all PCDs in the proximity communication system. The traffic channel (DTCH) may be used by PCDs after establishment of a connection to exchange user data. The common control channel (CCCH) may be a channel shared by all PCDs in the system for, among other things, transmitting a call connection request message. The dedicated control channel (DCCH) may be used in establishing a connection for control messages following the transmission on CCCH of the connect request.

Figure 9:
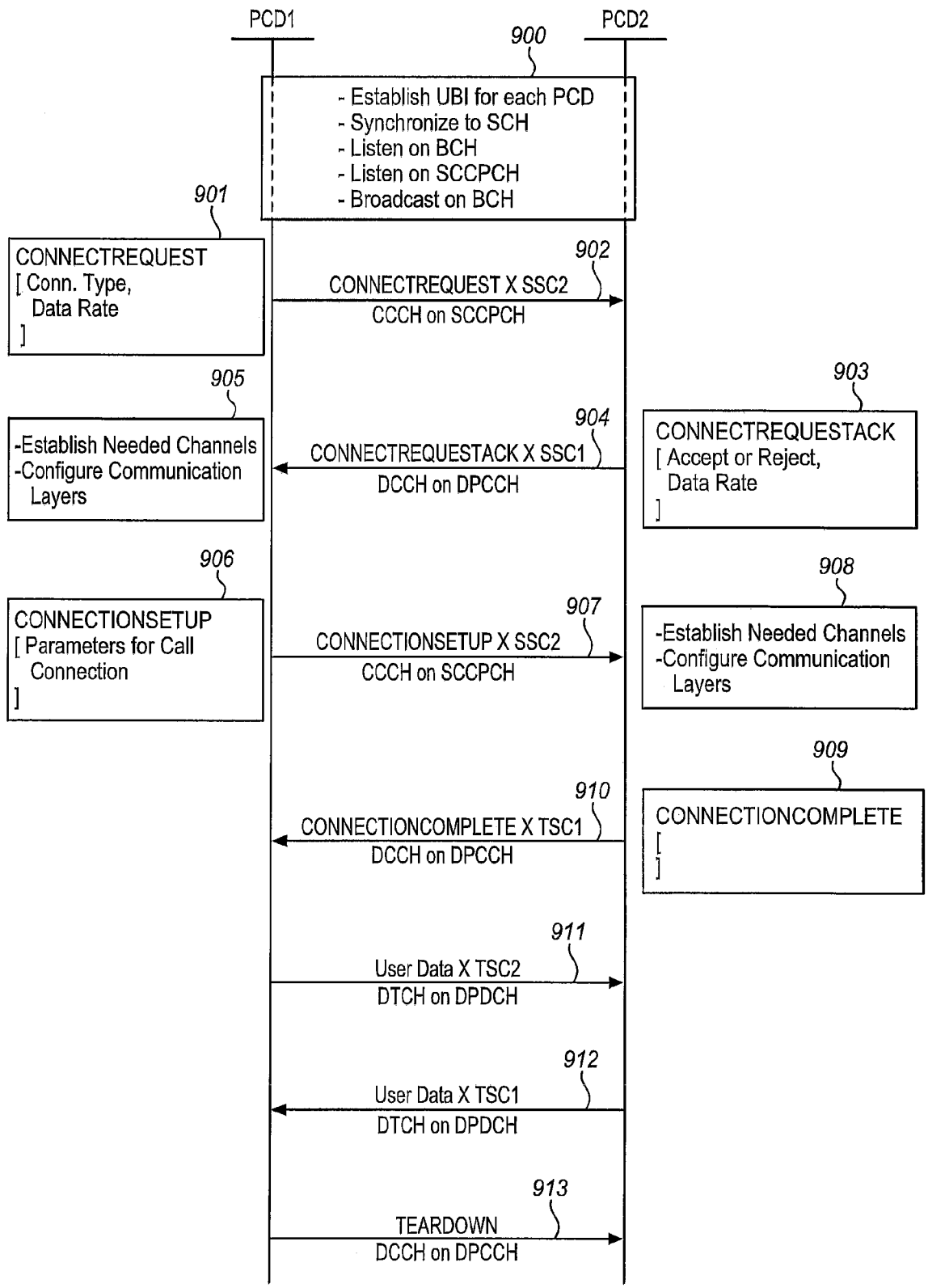
FIG. 9 is a timeline diagram describing an exemplary call management and data exchange process between two proximity communication devices in accordance with features and aspects hereof.

FIG. 9 is a diagram providing another form of description of an exemplary protocol defined for the proximity communication system in accordance with features and aspects hereof. FIG. 9 represents a timeline presentation of PCD initialization, call connection establishment, and data exchange through an established connection. In the timeline diagram of FIG. 9, time is advancing downward in the figure. A vertical line labeled PCD1 represents processing associated with the PCD desiring to initiate the call connection while the vertical line labeled PCD2 represents processing associated with the recipient of a connection request. Box 900 represents processing performed by all PCDs of a proximity communication system. All PCDs in a proximity communication system initialize themselves by first establishing the device specific broadcast information (UBI) for its configuration. As noted above, the UBI may include the first phase scrambling code used for communicating with this PCD as well as location information indicating that initial location of the corresponding PCD and other attributes and indicia useful in selecting a PCD to establish a call connection. After the system is powered up and all the information for signal and call processing is set-up in each PCD, a call is initiated by a requesting (e.g., calling) PCD (PCD1 of FIG. 9). As noted above, for purposes of this exemplary exchange, 3GPP well known channels may be utilized. Those of ordinary skill in the art will readily recognize that any desirable logical channel definitions may be employed. 3GPP standards merely supply one common, well known architecture in which features and aspects hereof may be advantageously implemented.

For example, the SCH provides a well known offset into the Primary Common Control Physical Channel (PCCPCH) that all PCDs access to transmit and receive location and other PCD specific information (i.e., information encoded as the UBI structure). This is a scrambled channel—scrambled with an authorized application-specific scrambling code that is specific to the type of PCD. In the context of a secured proximity communication system, the PCCPCH would be scrambled with a private secure scrambling code to which unsecured PCD users will not have access. The PCD then "tunes" itself to the PCCPCH to obtain the location information of other PCDs within radio range. Along with transmission of the UBI during initialization, PCDs also transmit corresponding offset for the Secondary Common Control Physical Channel (SCCPCH). The scrambling code that is received in the UBI of a far-end device is used to scramble a Connection Request Message (as discussed below). The receiving PCD then has to just "tune" itself to its SCCPCH offset and apply its In-Link scrambling code to decode the request.

A PCD (e.g., PCD1), when setting up a call, makes a request for connection to another PCD (e.g., PCD2) as indicated by box 901. It sends a Connection Request Message over the Secondary Common Physical Control Channel (SC-CPCH) as indicated by arrow 902. The request message is carried on the CCCH (the request is scrambled using the secondary device-specific scrambling code provided by PCD2). The request may provide—Connection Type—e.g., voice or packet data.

As shown in box 903 and arrow 904, PCD2 then responds by encoding its response message (on its Out-Link) with the secondary In-Link device-specific scrambling code of PCD1. The acknowledgement message is encoded on the CCCH logical channel carried by the SCCPCH. This response Connection Ack Message can have an unconditional/conditional accept/reject indicia (e.g., accepted or rejected conditional on a lower/higher data rate or on a third party call-flag, etc.).

In response to receipt of the acknowledgement (with any conditional parameters indicated), PCD1 then configures its upper layer protocol stacks based on the accept message from PCD2 as indicated by box 905 and sends a Connection Setup Message which directs PCD2 to correspondingly configure its upper layer protocol stacks as indicated by box 906 and arrow 907. PCD1 also transmits a dedicated tertiary scrambling code information that it will then use to read all dedicated messages on its In-Link. The Connection Setup Message can contain the following details:

Parameters of its own Dedicated Physical Control Channel DPCCH (multiplexed onto the Dedicated Physical Channel DPCH) after configuration of its upper layer protocol stacks.

Indicia of a Dedicated Transport Channel (DCH).

Indicia of a Logical Dedicated Control Channel DCCH (that will be carried on the Dedicated Physical Control Channel DPCCH that is multiplexed onto the Dedicated Physical Channel DPCH).

A generated pseudo-random sequence that will be its dedicated tertiary In-Link Scrambling Code for traffic channels.

Responsive to the setup message, PCD2 uses these parameters to configure its own protocol layers by establishing its protocol stacks and transport and logical channels based on the request as indicated by box 908. Specifically PCD2 may:

Establish a Dedicated Transport Channel DCH based on the parameters received.

Establish the corresponding logical Dedicated Traffic Channel (DTCH that will be carried on the Dedicated Physical Data Channel DPDCH).

Determine parameters for establishing the DTCH that are sent to the far side.

Generates a pseudo-random sequence for its tertiary dedicated In-Link traffic scrambling code.

PCD2 then transmits this information as a Connection Complete message as indicated by box 909 and arrow 910 scrambled with the tertiary dedicated scrambling code of PCD1, over the DCCH that is multiplexed over Dedicated Physical Control Channel. PCD1 may then establish its traffic transport and logical channels for exchanging traffic data. The two scrambling codes exchanged during signaling will be used for transmission over the dedicated traffic channels. Each PCD will scramble its Out-Link messages with the tertiary dedicated In-Link scrambling code of the receiver. Arrows 911 and 912 represent ongoing exchanges of information between the two PCDs during the established call connection.

After two devices setup a call connection they may perform power control algorithms (not shown in FIG. 9) to make sure other devices closer to one of the communicating PCDs do not drown the signal from the other communicating PCD of this connection. Those of ordinary skill will recognize that this power control tuning is different from the well known use of a constant strength beacon signal that is used for location estimation by triangulation. Well known signal processing of a constant strength beacon signal from each of at least two other wireless devices may be used to locate a device as discussed above where the device is devoid of GPS or other direct locator circuits. The above noted power control tuning is performed on the carrier signals used for exchange of information rather than the beacon signals used in such location estimations.

When a PCD terminates the call connection, a tear down message is sent from the disconnecting device to the far end device such as indicated by arrow 913. It will be understood that either side of the connection may decide to end the connection and issue the tear down message to the other device. When this message is received, all the channels and dedicated random codes are purged and the links dropped. The In-Link scrambling codes and other PCD specific information may be maintained until the unit is powered off and then re-established upon power up initialization and call connection establishment. Channelization codes for the various dedicated and common control and traffic channels are predefined in the system and may use standard definitions such as in 3GPP or other industry specifications. For a multi-way connection, the traffic packets are duplicated and scrambled using the multiple tertiary dedicated scrambling codes for each of the receivers and transmitted on the Dedicated Traffic Channel. The signaling for this process is similar to the steps given above, except the coordination occurs among all participating devices. If the participating devices are synchronized differently, they will transmit information at the appropriate slot/frame boundaries the same as the far end device. It should be noted that devices continue to transmit their location and attribute information on the common channels both when devices are idle and when they are in call. If a device receives two or more call connection requests at the same time, the appropriate caller information is displayed on the device giving the receiving user the option to select one or more of the calling devices. No handoffs are needed such as in cellular telephony because the PCDs do not traverse any network elements. If the signal strength becomes weak as the two devices move farther apart, the call is automatically terminated. This does not present a very crucial shortcoming since most calls originating from a PCD are typically for a short duration and for a short distance.

Though the exemplary exchange of FIG. 9 suggests use of specific channels and specific scrambling codes, these are intended merely as exemplary of one possible call connection in accordance with features and aspects hereof. Any number of channels and or scrambling codes may be used for such a connection. Thus one of ordinary skill in the art will readily recognize a wide variety of particular channels and/or scrambling codes (i.e., spreading codes and techniques) to establish and utilize a peer-to-peer connection between any pair of communicating PCDs.

Those of ordinary skill in the art will recognize that the exemplary, simplified call connection protocol discussed above with respect to FIGS. 5 through 10 are merely intended as suggestive of one possible protocol useful in the proximity communication system providing features and aspects hereof. Numerous equivalent protocols may be designed as a matter of design choice or existing call processing protocols such as cellular telephony call processing protocols may be utilized. However, extraneous additional features in the cellular telephony call processing protocol not required for this simpler application may simply be ignored and a small subset of standardized call processing messages can be utilized. Alternatively, a larger, richer subset of call processing features may be adopted in the proximity communication system to permit further enhanced features. Further, those of ordinary skill in the art will recognize that any suitable collection of logical and physical channels may be defined for the connection between any two PCDs.

Various exemplary embodiments of the proximity communication system features and aspects hereof have been presented above with respect to voice and/or data communication systems. Those of ordinary skill in the art will also recognize applicability of features and aspects hereof to a wireless gaming environment. In other words, a plurality of PCDs may be used in a system where the purpose of the communications is to permit multi-player gaming. Each PCD may present video game interface capabilities to its user and the PCDs may exchange data (and/or voice) to provide wireless, multi-player gaming. All such gaming devices (PCDs) in the area may participate in accordance with any desired security features to exchange information among the various players of the multiplayer game.

The structures and methods above describe exemplary communication structures and methods for a system of PCDs. As discussed, other PCDs in the proximity of a first PCD are identified by the first PCD primarily by their relative location to the first PCD and by other attributes of the other PCDs. A variety of convenient user display features are provided by features and aspects hereof for display on the first PCD of information regarding the system as a whole, information regarding the PCDs near the first PCD, and other information for a user of the first PCD. For example, each other PCD in the proximity of the first PCD may be presented on the display of the first PCD with a unique icon or glyph. The icon or glyph image could be provided by each PCD as part of its broadcast information or may be entered by the PCD user in a setup or configuration mode. The relative position of all other PCDs on the first PCD display screen may be dynamically updated as each PCD moves about within the system. As noted above, all attributes and information regarding a PCD may be stored in tables of the presenting PCD and indexed by the PTI (temporary ID) of each other PCD. The PCD presenting the display could be positioned at the center of the display screen and the relative location of all other PCDs may be presented displaced from that center proportionate to their relative location to this PCD. The icon/glyph and/or attributes of nearby PCDs displayed on the screen of each PCD may overlay a map such as a street map or topographic terrain map to visually aid the user in locating nearby PCDs. Those of ordinary skill in the art will also recognize that a simple list of textual information may be used to present information about any other PCD. The displayed positions of PCDs could be scaled to an area of interest. In other words, the scale of the distances displayed on the user's PCD display screen could be zoomed in or out to include a larger or smaller area of the locale in the display (e.g., more PCDs within a wider range or fewer other PCDs within a narrower range).

The broadcast information from each PCD could also identify useful attributes of the PCD for use by all receiving devices. Thus, for example, a user's PCD could display attribute information for all PCDs in its proximity. Attributes could include, for example, labels such as "Police", "Fireman", "EMT", "Artillery", "Commander", "Restaurant", "Gas Station", "Cab", etc. These and other attributes may be displayed persistently on the display of the receiving PCD or may be displayed at the user's request such as when a user points to a PCD displayed on its display screen (e.g., using a pointing device interface on the PCD such as a stylus).

The display on each PCD may also be presented in a number of levels or layers. A first layer may present nearby PCDs with their respective location information (e.g., relative location from this PCD as presented graphically according to current "zoom" scaling). Another layer display may be presented when a user selects (e.g., points to) a particular PCD. The display may then shift to an information display regarding the selected PCD. Attributes and other information regarding that PCD may then be presented and a "back" button or selection can restore the display to the earlier display of relative locations of all other PCDs. Still further, a layer or level of the display may be selected to present capabilities attributes associated with all PCDs in the system or with respect to a selected PCD on the user's display. Capabilities may include features such as "voice communication capable", "data communication capable", "game/packet connection capable", "Game X compatible", "email capable", "text message capable", "web client/host capable", etc. Yet another layer may be selected to compute and display a measure of the distance between this PCD and a selected other PCD on the display or between two selected PCDs on the display screen.

Still further, when the system is used to present multiplayer game applications, the displays of all PCDs engaged in a current game will be coordinated to assure a substantially similar display on all devices.

The PCD display may also include user configuration and filtering features to permit the user to configure how many other PCDs to display or which particular types to include or exclude from display. A user may simply configure a maximum number "X" of PCDs to display. The first X other PCDs will then be displayed selected based upon configurable selection criteria. For example, a user may configure a PCD to display only the X closest PCDs. Or a user may define a filter indicating only other PCDs that are "Game X compatible" or "Game Y compatible" or only "Police" PCDs, etc. be displayed. Those of ordinary skill in the art will recognize a wide variety of filter conditions and configurations to permit a user to customize the display presented so that only PCDs "of interest" to the user will be displayed.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

I claim:

1. A proximity communication device ("PCD") comprising:
    a locator to determine the geographic location of said PCD; and
    a wireless transceiver for exchanging information between said PCD and other PCDs wherein the information exchanged includes location information of all PCDs and wherein the information exchanged further includes user data,
    wherein said PCD is adapted to initially establish a peer-to-peer connection with another identified PCD, wherein said another identified PCD is selected by a user of the PCD based on the location information of said another identified PCD, and
    wherein said PCD is adapted to communicate with said other PCDs by synchronizing exchanges using one or more synchronization channels transmitted through the wireless transceiver such that synchronization information derived from one or more timing sources is transmitted on the one or more synchronization channels.

2. The PCD of claim 1
    wherein the locator of said PCD further comprises a Global Positioning System ("GPS") receiver, and
    wherein said PCD is adapted to generate GPS derived synchronization information derived from a clock signal received by the GPS receiver as one of the multiple timing sources.

3. The PCD of claim 1
    wherein said PCD is adapted to generate locally derived synchronization information applied to a shared synchronization channel of the multiple synchronization channels wherein the locally derived synchronization information is derived from a timing source locally generated within said PCD.

4. The PCD of claim 1
    wherein said PCD is adapted to receive GPS derived synchronization information on a shared synchronization channel wherein the GPS derived synchronization information is generated by another PCD that includes a GPS receiver,
    wherein said PCD is further adapted to receive locally derived synchronization information applied to another shared synchronization channel wherein the locally derived synchronization information is generated by another PCD, and
    wherein said PCD is further adapted to select among the shared synchronization channels for use in communicating with other PCDs.

5. The PCD of claim 1
    wherein said PCD is adapted to utilize an application-specific scrambling code to broadcast information regarding said PCD to other PCDs.

6. The PCD of claim 5
wherein said application-specific scrambling code is one of a plurality of application-specific scrambling codes organized as a security hierarchy of scrambling codes ranging from highest security scrambling codes to lowest security scrambling codes and wherein said PCD is adapted to provide security by receiving broadcast information from other PCDs using a predetermined scrambling code that precludes access to broadcast information from other PCDs using an application specific scrambling code hierarchically higher than said predetermined scrambling code.

7. The PCD of claim 1
wherein the locator is a locating means selected from the group consisting of:
Global Positioning System ("GPS") locating means, automated relative positioning means, and user input positioning means.

8. A system comprising:
a plurality of proximity communication devices ("PCDs"), each PCD further comprising:
a locator to determine the geographic location of said PCD; and
a wireless transceiver for exchanging information between said PCD and other PCDs wherein the information exchanged includes location information of all PCDs and wherein the information exchanged further includes user data,
wherein each PCD of the plurality of PCDs is adapted to initially establish a peer-to-peer connection with another identified PCD of the plurality of PCDs, wherein said another identified PCD is selected by a user of said each PCD based on the location information of said another identified PCD, and
wherein said each PCD shares multiple synchronization channels to exchange synchronization information with other PCDs of the plurality of PCDs based on multiple timing sources,
wherein said each PCD is adapted to communicate with said other PCDs by synchronizing exchanges using one or more synchronization channels transmitted through the wireless transceiver such that synchronization information derived from one or more timing sources is transmitted on the one or more synchronization channels.

9. The system of claim 8
wherein the locator of at least one PCD of the plurality of PCDs further comprises a Global Positioning System ("GPS") receiver, wherein said at least one PCD is adapted to generate GPS derived synchronization information derived from a clock signal received by the GPS receiver used as one of the multiple timing sources, and wherein said at least one PCD is adapted to transmit the GPS derived synchronization information on one of the multiple synchronization channels, and
wherein each PCD of the plurality of PCDs further comprises a local timing source, wherein said each PCD is adapted to generate locally derived synchronization information derived from its local timing source used as another of the multiple timing sources, and wherein each PCD is adapted to transmit the generated locally derived synchronization on another of the multiple synchronization channels.

10. The system of claim 9
wherein each PCD is further adapted to select among the multiple synchronization channels for use in communicating with other PCDs.

11. The system of claim 8
wherein each PCD is adapted to broadcast identification information to all other PCDs utilizing an application-specific scrambling code, and
wherein the broadcast identification information includes a unique temporary identifier further identifying said each PCD.

12. The system of claim 11
wherein said application-specific scrambling code is one of a plurality of application-specific scrambling codes organized as a security hierarchy of scrambling codes ranging from highest security scrambling codes to lowest security scrambling codes and wherein said PCD is adapted to provide security by receiving broadcast information from other PCDs using a predetermined scrambling code that precludes access to broadcast information from other PCDs using an application specific scrambling code hierarchically higher than said predetermined scrambling code.

13. The system of claim 8
wherein each PCD of the plurality of PCDs provides a video game user interface and wherein each PCD is adapted to play a video game in conjunction with other PCDs by exchange of information through the wireless transceiver of each of the plurality of PCDs.

14. A method for proximity based communication comprising:
establishing multiple synchronization channels for use among a plurality of proximity communication devices ("PCDs") using wireless communication;
displaying the relative position of the other PCDs on a display screen of a first PCD of the plurality of PCDs;
selecting a second PCD from the displayed other PCDs based on location information relating to the proximity of the second PCD relative to the first PCD;
selecting one of the multiple synchronization channels for use in communications between the first PCD and the second PCD; and
initially establishing at least one call connection between the first PCD and the second PCD wherein the call connection is synchronized utilizing the selected synchronization channel.

15. The method of claim 14 further comprising:
wherein the step of establishing multiple synchronizations channels further comprises:
establishing a Global Positioning System ("GPS") derived synchronization channel from a GPS based timing source associated with the at least one PCD of the plurality of PCDs, and
establishing a locally derived synchronization channel from a local timing source associated with at least one PCD of the plurality of PCDs.

16. The method of claim 15
wherein the step of selecting one of the multiple synchronization channels further comprises:
selecting the GPS derived synchronization channel if both the first PCD and the second PCD receive signals on the GPS derived synchronization channel;
selecting the locally derived synchronization channel if either or both of the first and second PCDs fail to receive signals on the GPS derived synchronization channel.

17. The method of claim 15 wherein the step of selecting the second PCD further comprises accepting user input to select the second PCD further based on attributes of the other PCDs.

18. The method of claim 14 wherein the step of displaying the relative position further comprises:

displaying a map of an area surrounding a user's PCD; and displaying an icon for each of other PCDs overlaying the map such that the position of each icon represents the relative location of said each other PCD relative to the user's PCD.

19. The method of claim 14 further comprising:

presenting information regarding a selected PCD from the other PCDs in response to user input requesting the information wherein the information presented comprises one or more of:

attributes of the selected PCD;

distance to the selected PCD; and capabilities of the selected PCD.

* * * * *

UNITED STATES PATENT AND TRADEMARK OFFICE
CERTIFICATE OF CORRECTION

PATENT NO. : 7,643,833 B2
APPLICATION NO. : 11/382608
DATED : January 5, 2010
INVENTOR(S) : Arun Sankisa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,643,833 B2 | Page 1 of 1 |
| APPLICATION NO. | : 11/382608 | |
| DATED | : January 5, 2010 | |
| INVENTOR(S) | : Sankisa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

In column 14, line 41, the text "tie locator" should read "the locator".

Signed and Sealed this

Twenty-third Day of November, 2010

David J. Kappos
*Director of the United States Patent and Trademark Office*